United States Patent
Fox et al.

(10) Patent No.: US 11,196,815 B2
(45) Date of Patent: Dec. 7, 2021

(54) CONNECTION MANAGEMENT SERVICE

(71) Applicant: AT&T Intellectual Property I, L.P., Atlanta, GA (US)

(72) Inventors: James Paul Fox, Dallas, TX (US); Barrett Kreiner, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 35 days.

(21) Appl. No.: 16/515,252

(22) Filed: Jul. 18, 2019

(65) Prior Publication Data

US 2021/0021674 A1 Jan. 21, 2021

(51) Int. Cl.
*H04L 29/08* (2006.01)
*H04L 29/06* (2006.01)

(52) U.S. Cl.
CPC ............ *H04L 67/14* (2013.01); *H04L 63/105* (2013.01); *H04L 67/20* (2013.01); *H04L 67/28* (2013.01); *H04L 67/42* (2013.01)

(58) Field of Classification Search
CPC ....... H04L 67/14; H04L 63/105; H04L 67/20; H04L 67/28; H04L 67/42
USPC ....................................... 709/224
See application file for complete search history.

(56) References Cited

U.S. PATENT DOCUMENTS

| | | | |
|---|---|---|---|
| 9,934,244 B2 | 4/2018 | Kreiner et al. | |
| 10,681,754 B2* | 6/2020 | Agiwal | H04W 8/02 |
| 2011/0291953 A1* | 12/2011 | Cheok | G06Q 10/06 345/173 |
| 2013/0287012 A1* | 10/2013 | Pragada | H04W 76/25 370/338 |
| 2015/0029936 A1* | 1/2015 | Johnsson | H01Q 3/00 370/328 |
| 2015/0282234 A1* | 10/2015 | Sartori | H04W 28/0278 370/329 |
| 2019/0028505 A1* | 1/2019 | Shpiner | H04L 69/163 |
| 2021/0073707 A1* | 3/2021 | Carlo | G06K 19/06028 |

* cited by examiner

*Primary Examiner* — Tu T Nguyen
(74) *Attorney, Agent, or Firm* — Hartman & Citrin LLC

(57) ABSTRACT

Concepts and technologies are disclosed herein for connection management service. A server computer can detect a request to create a connection between a first resource and a second resource. The first resource can be in a proximity of a computing device and the second resource may not be in a proximity of the computing device. The request can be triggered by a requestor. Authentication of the requestor can be triggered, and identification of the first resource can be obtained. The identification of the first resource can be obtained from the computing device. Connection information for the connection between the first resource and the second resource can be obtained and creation of the connection using the connection information can be triggered.

20 Claims, 14 Drawing Sheets

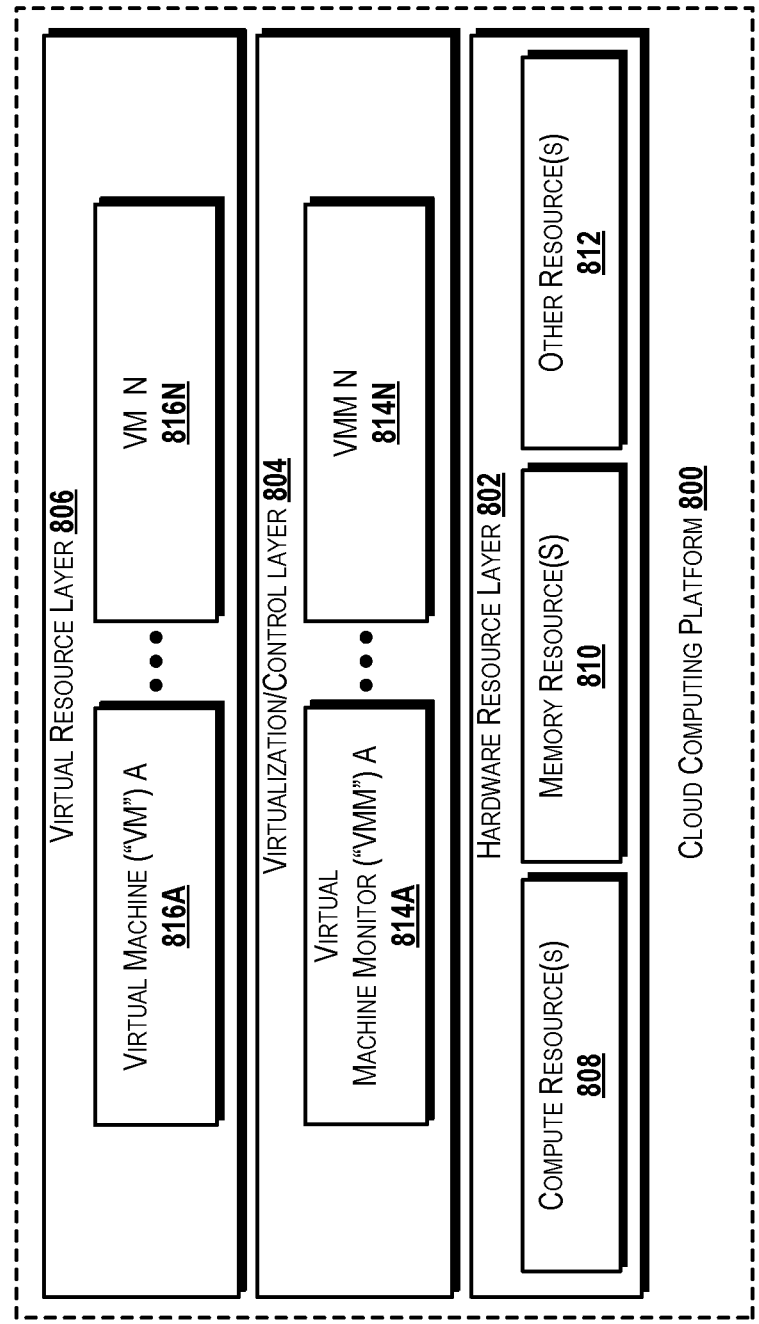

CONNECTION MANAGEMENT SERVICE

BACKGROUND

The number of devices and services, both physical and virtual, that are available today (aka "resources") is growing at an exponential rate. These resources can have a variety of standard common "aspects," as well as unique aspects. Due to the proliferation of these and other devices, the possible permutations of connecting one or more aspects of these resources to another (or to themselves) are exponentially increasing.

Once a desired connection is identified for a particular resource, the configuration of such a connection can be complex. In particular, a great deal of information may be needed to connect resource aspects together. The information may or may not be documented, but at any rate often must be determined through trial and error and may require engagement of a trained person who can create the desired connection.

Furthermore, connecting some resources may require implicit or explicit authority, which may be missing in some situations. Also, such connections may require resource-specific authorization, the obtaining of which may delay creating desired connections.

SUMMARY

The present disclosure is directed to connection management service. A user or other entity can activate a connection management application executed by a computing device. The connection management application can be configured to create and/or to manage a connection between two resources. In some embodiments, the computing device itself can be one of the resources and therefore can be connected to another resource using the connection management application, if desired. The connection management application, the connection management service, and/or the computing device can authenticate the user or other entity (or request authentication from other devices such as an authentication, authorization, and accounting ("AAA") server or service). Once authenticated, the connection management application can prompt the user for information identifying one or more of the resources that are to be connected. The connection management application can be used to scan or otherwise obtain an identifier associated with a first resource of the resources, and the connection management service can obtain a resource identifier associated with the second resource of the resources. The resource identifier can be obtained, in various embodiments, from the user, from the server computer, from other devices, and/or in other manners.

Via exchanging data with the server computer, the connection management application can communicate to the connection management service the identities of one or more of the resources that are to be connected and/or can communicate to the connection management service a particular connection that is to be created between the resources. The connection management service can access connection data that provides operations to be performed to create the desired connection. The connection management service can be configured to perform one or more of the operations and/or to request performance of one or more of the operations by other entities to create the connection. Information that describes connections associated with the user and/or the computing device can be stored by the connection management service and can be used for various purposes.

The connection can be enabled, and the resources can exchange data via the connection for various purposes. In various embodiments, the information that describes the various connections associated with a user or the computing device can be communicated to the computing device by the connection management service to enable management (viewing, changing, deleting, enabling, and/or disabling) of the connections.

According to one aspect of the concepts and technologies disclosed herein, a system is disclosed. The system can include a processor and a memory. The memory can store computer-executable instructions that, when executed by the processor, cause the processor to perform operations. The operations can include detecting a request to create a connection between a first resource and a second resource. The first resource can be in a proximity of a computing device. The second resource may not be in a proximity of the computing device (e.g., may be outside of the proximity of the computing device). The request can be triggered by a requestor, and the requestor can be authenticated. The operations also can include obtaining identification of the first resource, where the identification of the first resource can be obtained from the computing device. The operations also can include obtaining connection information for the connection between the first resource and the second resource, and triggering creation of the connection using the connection information.

In some embodiments, the identification of the first resource can be obtained by a camera of the computing device. In some embodiments, the identification of the second resource can include a globally unique identifier, where the identification of the second resource can be obtained from the computing device. In some embodiments, the requestor can be authenticated by the processor based on identification information obtained from the computing device. In some embodiments, triggering creation of the connection can include negotiating a most secure connection available between the first resource and the second resource.

In some embodiments, the computer-executable instructions, when executed by the processor, can cause the processor to perform operations further including detecting a failure in the creation of the connection; and engaging a third party to complete the connection. In some embodiments, the computer-executable instructions, when executed by the processor, can cause the processor to perform operations further including detecting a failure in the creation of the connection; and sending step-by-step instructions to the computing device to complete the connection. In some embodiments, the first resource and the second resource can exchange data via the connection.

According to another aspect, a method is disclosed. The method can include detecting, at a server computer including a processor, a request to create a connection between a first resource and a second resource. The first resource can be in a proximity of a computing device, and the second resource may not be in a proximity of the computing device (e.g., can be outside the proximity of the computing device). The request can be triggered by a requestor, and the requestor can be authenticated. The method also can include obtaining, by the processor, identification of the first resource, where the identification of the first resource can be obtained from the computing device; obtaining, by the processor, connection information for the connection between the first resource and the second resource; and triggering, by the processor, creation of the connection using the connection information.

In some embodiments, the identification of the first resource can be obtained by a camera of the computing device. In some embodiments, the identification of the second resource can include a globally unique identifier, where the identification of the second resource can be obtained from the computing device. In some embodiments, triggering creation of the connection can include negotiating a most secure connection available between the first resource and the second resource. In some embodiments, the method further can include detecting a failure in the creation of the connection; and engaging a third party to complete the connection. In some embodiments, the method further can include detecting a failure in the creation of the connection; and sending step-by-step instructions to the computing device to complete the connection.

According to yet another aspect of the concepts and technologies disclosed herein, a computer storage medium is disclosed. The computer storage medium can store computer-executable instructions that, when executed by a processor, cause the processor to perform operations. The operations can include detecting a request to create a connection between a first resource and a second resource. The first resource can be in a proximity of a computing device. The second resource may not be in a proximity of the computing device (e.g., may be outside of the proximity of the computing device). The request can be triggered by a requestor, and the requestor can be authenticated. The operations also can include obtaining identification of the first resource, where the identification of the first resource can be obtained from the computing device. The operations also can include obtaining connection information for the connection between the first resource and the second resource, and triggering creation of the connection using the connection information.

In some embodiments, the identification of the first resource can be obtained by a camera of the computing device. In some embodiments, the identification of the second resource can include a globally unique identifier, where the identification of the second resource can be obtained from the computing device. In some embodiments, triggering creation of the connection can include negotiating a most secure connection available between the first resource and the second resource.

In some embodiments, the computer-executable instructions, when executed by the processor, can cause the processor to perform operations further including detecting a failure in the creation of the connection; and engaging a third party to complete the connection. In some embodiments, the computer-executable instructions, when executed by the processor, can cause the processor to perform operations further including detecting a failure in the creation of the connection; and sending step-by-step instructions to the computing device to complete the connection.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIG. 8 is a diagram illustrating a computing environment capable of implementing aspects of the concepts and technologies disclosed herein, according to some illustrative embodiments of the concepts and technologies described herein.

DETAILED DESCRIPTION

Figure 1:
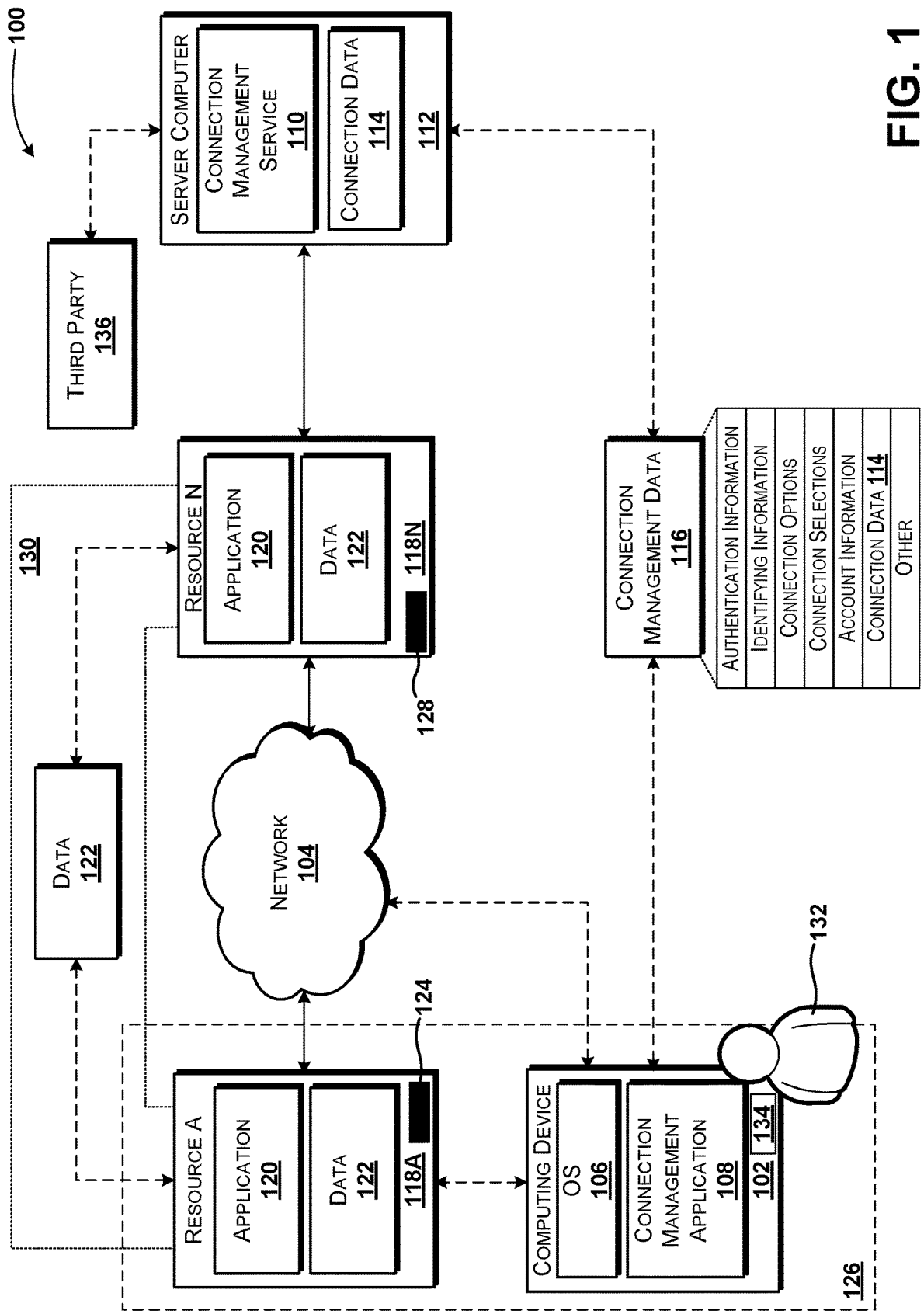
FIG. 1 is a system diagram illustrating an illustrative operating environment for various embodiments of the concepts and technologies described herein.

The following detailed description is directed to connection management service. A user or other entity can activate a connection management application executed by a computing device. The connection management application can be configured to create and/or to manage a connection between two resources. In some embodiments, the computing device itself can be one of the resources and therefore can be connected to another resource using the connection management application, if desired. The connection management application, the connection management service, and/or the computing device can authenticate the user or other entity (or request authentication from other devices such as an AAA server or service). Once authenticated, the connection management application can prompt the user for information identifying one or more of the resources that are to be connected. The connection management application can be used to scan or otherwise obtain an identifier associated with a first resource of the resources, and the connection management service can obtain a resource identifier associated with the second resource of the resources. The resource identifier can be obtained, in various embodiments, from the user, from the server computer, from other devices, and/or in other manners.

Via exchanging data with the server computer, the connection management application can communicate to the connection management service the identities of one or more of the resources that are to be connected and/or can communicate to the connection management service a particular connection that is to be created between the resources. The connection management service can access connection data that provides operations to be performed to create the desired connection. The connection management service can be configured to perform one or more of the operations and/or to request performance of one or more of the operations by other entities to create the connection. Information that describes connections associated with the user and/or the computing device can be stored by the connection management service and can be used for various purposes. The connection can be enabled, and the resources can exchange data via the connection for various purposes. In various embodiments, the information that describes the various connections associated with a user or the computing device can be communicated to the computing device by the connection management service to enable management (viewing, changing, deleting, enabling, and/or disabling) of the connections.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for connection management service will be described, according to an illustrative embodiment. The operating environment 100 shown in FIG. 1 can include a computing device 102. As shown in FIG. 1, the computing device 102 can operate in communication with and/or as part of a communications network ("network") 104, though this is not necessarily the case.

According to various embodiments, the functionality of the computing device 102 may be provided by one or more server computers, desktop computers, mobile telephones, smartphones, laptop computers, tablet computers, set-top boxes, gateway devices, other computing systems, and the like. It should be understood that the functionality of the computing device 102 can be provided by a single device, by two or more similar devices, and/or by two or more dissimilar devices. For purposes of describing the concepts and technologies disclosed herein, the computing device 102 is described herein as a mobile telephone. Because this example is used to illustrate the concepts and technologies disclosed herein, it should be understood that this specific embodiment is illustrative, and therefore should not be construed as being limiting of the concepts and technologies disclosed herein in any way.

The computing device 102 can execute an operating system ("OS") 106 and one or more application programs such as, for example, a connection management application 108. The operating system 106 is a computer program for controlling the operation of the computing device 102. The application programs including the connection management application 108 can include executable programs that are configured to execute on top of the operating system 106 to provide various functions as illustrated and described herein. While only a connection management application 108 is shown in FIG. 1, it can be appreciated that various functionality illustrated and described herein can be performed and/or provided by multiple application programs. Similarly, it should be understood that various functions of the connection management application 108 illustrated and described herein can be performed by other application programs without departing from the scope of this disclosure. As such, the illustrated embodiment is illustrative of one contemplated embodiment and should not be construed as being limiting in any way.

The connection management application 108 can be configured to enable a user or other entity to interact with a connection management service 110. The connection management service 110 can include a service, application, or other functionality that can be hosted, stored, and/or executed by a processing component such as a processor of a computing device such as a server computer 112. In some embodiments, the connection management service 110 can include a distributed application that can be hosted in a cloud environment (e.g., a data center), and as such the illustrated embodiment must be understood as being merely illustrative of one contemplated embodiment and should not be construed as being limiting in any way.

As will be explained in more detail below, the connection management service 110 can be configured to access connection data 114. The connection data 114 can be stored or hosted by the server computer 112, in some embodiments, or can be stored by another device or functionality (not shown in FIG. 1) such as one or more real or virtual data stores, databases, server computers, desktop computers, mobile telephones, laptop computers, other computing systems, and the like. The connection data 114 can include various types of information, which will be explained in more detail below, once the various elements of the operating environment 100 are introduced. According to various embodiments of the concepts and technologies disclosed herein, the computing device 102 can exchange connection management data 116 with the connection management service 110 to create and/or manage connections between one or more other devices, hardware, services, applications, or other resources (hereinafter "resources").

In particular, the operating environment 100 can includes two or more resources 118A-N (hereinafter collectively and/or generically referred to as "resources 118"). As will be explained in more detail herein, the connection management service 110 can be configured to create and/or manage an authorized and secure connection between two or more resources 118.

The resources 118 can include almost any type of application, service, device, or other resource including, but not limited to, gaming consoles; set-top boxes ("STBs"); set-top units ("STUs"); other customer premises equipment or customer provided equipment ("CPE"); server computers (e.g., game servers, application servers, web servers, etc.); gateway devices; connected home devices such as appliances, alarm systems, alarm system components, and/or other devices or components; computing devices such as tablets, personal computers, mobile telephones, laptops, or other devices; display devices such as monitors, televisions, or other devices; cable, satellite, or internet video devices (e.g., receivers, recorders, routers, or the like); networking devices (e.g., modems, routers, switches, or the like); other devices; an application; a service; combinations thereof; or the like. As will be clearer from the description herein, the resources 118 can include almost any device, component, and/or other form of hardware, and as such, the various examples provided herein are illustrative only and should not be construed as being limiting in any way.

As shown in FIG. 1, the resources 118 can include one or more application programs ("applications") 120 and one or more instances of data 122. Resources 118 can include processors and memories (not shown in FIG. 1), and the processors can execute the applications 120 and use the data 122 to provide various functionality. By way of example, the resource 118A can correspond to a gaming console, in which case the application 120 can provide gaming functionality using the data 122. It should be understood that this example is illustrative, and therefore should not be construed as being limiting in any way.

According to various embodiments of the concepts and technologies disclosed herein, one or more of the resources 118 can include an identifier 124. According to various embodiments, the identifier 124 can include a visual identifier or visual indicia such as one or more bar codes, universal product code ("UPC") identifiers, or other identifiers. The identifier 124 also can include one or more two-dimensional identifiers such as quick response codes ("QR codes"), MAXICODE, a DATA MATRIX, an EZCODE, an AZTEC code, a CODABLOCK barcode, and/or other matrix barcodes; various multicolor codes such as a HIGH CAPACITY COLOR BARCODE and/or a HUECODE; combinations thereof; or the like. In some other embodiments, the identifier 124 can include a device or other hardware that can be configured to store and/or transmit identifying information such as a radio frequency identification ("RFID") tag or label, a near-field communication ("NFC") tab or label, and/or other devices or combinations thereof (e.g., a memory in communication with a WiFi chip) for storing and/or transmitting identification information to other devices (e.g., the computing device 102) in a proximity of the resource 118. Because the identifier 124 can include additional and/or alternative types of indicia, it should be understood that these embodiments are illustrative, and should not be construed as being limiting in any way.

In various embodiments, one or more of the resources 118 can be configured to transmit the identifier 124 only to a device in a proximity 126 of the resources 118, and as such. In the illustrated embodiment, for example, the resource 118A can be configured to provide identifying information only in a proximity 126 thereof and therefore can include visual indicia and/or a short-range device such as an RFID tag, NFC tag, or the like. According to various embodiments of the concepts and technologies disclosed herein, and in the claims unless otherwise noted, the first resource 118 can be in the proximity 126 of the computing device 102 (or the computing device 102 can be in the proximity 126 of the first resource 118), while the second resource 118 (to which the first resource 118 is being connected) is not in the proximity 126 of the computing device 102 or the first resource 118. It should be understood that this example is illustrative, and therefore should not be construed as being limiting in any way.

As shown in FIG. 1, one or more of the resources 118 can include a resource identifier 128. In some embodiments, the resource identifier 128 can include visual indicia that can be similar to, dissimilar to, or identical to the identifier 124. In some other embodiments, including the embodiment shown in FIG. 1, the resource identifier 128 can include identifying information in a digital format such as a data file that represents identifying information for the resource. In various embodiments, the resource identifier 128 can represent, for example, a media access control ("MAC") address for the resource 118, an Internet protocol ("IP") address of the resource 118, an international mobile equipment identity ("IMEI") or international mobile subscriber identity ("MR") associated with the resource 118, a character string (e.g., a globally unique identifier ("GUID"), a hash value, or other characters) that can identify the resource 118, other identifiers, combinations thereof, or the like. For purposes of illustrating and describing the concepts and technologies disclosed herein, the resource identifier 128 will be described herein as data that identifies the resource 118N. It should be understood that this example is illustrative, and therefore should not be construed as being limiting in any way.

Returning now to the computing device 102, various embodiments for using the operating environment 100 to create and/or manage connections between resources 118 will be described in detail, according to one illustrative embodiment. The computing device 102 can execute the connection management application 108 to create and/or manage a secure and manageable connection ("connection") 130 between two or more resources 118. According to various embodiments, a user or other entity ("user") 132 can activate or launch the connection management application 108 to create or manage the connection 130. According to various embodiments, the connection management application 108 can be configured to authenticate the user 132 (or otherwise trigger authentication of the user 132 by the connection management application 108, the connection management service 110, and/or by one or more other entities) upon launch of the connection management application 108. According to various embodiments, the connection management application 108 can exchange authentication information with the server computer 112 as part of the connection management data 116 that is exchanged (two way communications) between the computing device 102 and server computer 112, though this is not necessarily the case. As will be more clear from the below description, the connection management service 110 can be configured to enable connections 130 between resources 118 only to the extent such connections 130 are authorized for the user 132 that is requesting the connection 130. This will be explained in more detail below.

In some embodiments, either before or after authentication of the user 132, the connection management application 108 can be configured to prompt the user 132 for various types of information including, but not limited to, information indicating if the user 132 wishes to create a new connection 130 or manage an existing connection 130, information relating to resources 118 between which the connection 130 is desired, information defining the connection 130 and/or the operation thereof, and/or other information as will be illustrated and described herein, particularly with reference to FIGS. 4A-4G. In various embodiments, the interactions between the connection management application 108 and the user 132 can occur via a user interface ("UI") 134, though this is not necessarily the case.

The connection management application 108 can obtain information that identifies a first resource 118 that is to be connected to another resource 118. In the context of the example operating environment 100 shown in FIG. 1, the connection management application 108 can obtain the information that identifies the resource 118A by way of interacting with the identifier 124. In the example embodiment shown in FIG. 1, the identifier 124 can include visual indicia and therefore the connection management application 108 can obtain the information by way of scanning a bar code or other visual indicia, receiving keystrokes or other input corresponding to an identifier, receiving a transmission from an RFID or NFC tag, label, or device, or the like. In some embodiments, the connection management application 108 can be configured to obtain identifying information for each of the two or more resources 118 that are being connected (or whose connection 130 is being managed).

In some other embodiments, the connection management application 108 can send identifying information to the connection management service 110, and the connection management service 110 can determine, for a particular resource 118, what connections 130 are available for the identified resource 118 and user 132 (e.g., the connection management service 110 can determine what connections 130 the user 132 is authorized to create for the resource 118 and what connections 130 are capable of being supported by various network resources). It should be understood that this example is illustrative, and therefore should not be construed as being limiting in any way.

Thus, the connection management application 108 can identify a second resource 118 (e.g., a resource 118 that is being connected to) by interacting with the connection management service 110 and/or by interacting with the user 132. In some embodiments, the connection management application 108 can send, to the server computer 112, data obtained from the identifier 124 (e.g., as part of the connection management data 116 shown in FIG. 1). The computing device 102 can receive, from the server computer 112, identifying information for the second resource 118 and/or one or more connection options, which can specify connections that are available to the user 132 for the specific resource identified by the identifying information sent by the connection management application 108. The identifying information and/or the connection options can be received as the connection management data 116, which as noted above can be exchanged with the server computer 112, as shown in FIG. 1.

The connection management application 108 can be configured to prompt the user 132 for input that indicates the second resource 118 with which the user 132 wants to connect the first resource 118. In the context of FIG. 1, the user 132 can be prompted for input that indicates the resource 118N to which the user 132 wishes to connect the resource 118A. The connection management application 108 can be configured to send data that represents the desired connection between the desired resources 118 as connection selections, which again can be included in the connection management data 116 that can be exchanged between the computing device 102 and the server computer 112. The connection management application 108 also can be configured to exchange with, or obtain from, the connection management service 110 account information. The account information can include, inter alia, information that can identify all connections 130 associated with the user 132 and/or an account so that these connections 130 can be identified and/or managed. This will be explained in more detail herein, particularly with reference to FIGS. 4A-4G.

The connection management service 110 can be configured to exchange, with the computing device 102, the connection management data 116. In particular, the connection management service 110 can receive authentication information from the computing device 102 and can authenticate the user 132. It can be appreciated that in various embodiments, the authentication of the user 132 (or the computing device 102) can be offloaded from the connection management service 110 and/or the server computer 112 to other devices and/or entities (e.g., an AAA service, or the like) and/or that authentication can be handled by the connection management application 108 executed by the computing device 102 (e.g., access to the connection management application 108 can be restricted to a user 132 that has successfully authenticated with the connection management application 108 and/or the computing device 102). If authentication is handled by devices or entities other than the connection management service 110 and/or the server computer 112, the connection management service 110 can receive authentication information for use in creating and/or managing connections 130. It should be understood that these examples are illustrative, and therefore should not be construed as being limiting in any way.

The connection management service 110 also can receive identifying information for a first resource such as the resource 118A. Based on the authentication information and/or authentication levels, permissions, identification of the first resource 118A, and/or other considerations associated with the user 132 and/or the computing device 102, the connection management service 110 can be configured to identify one or more other resources (e.g., the resource 118N) with which the user 132 or computing device 102 is authorized to create a connection 130. In the context of FIG. 1, if the connection management data 116 identifies the resource 118A, the connection management service 110 can determine, based on the identity of this resource 118A and based on other information such as permissions for the user 132 or the computing device 102, what resources 118 the resource 118A can communicate with. It should be understood that this example is illustrative, and therefore should not be construed as being limiting in any way.

Alternatively, the connection management service 110 can receive, from the computing device 102, identification of two resources 118 between which the user 132 or other entity wishes to create a connection 130. The connection management service 110 can determine, based on the identification of the resources 118 and information associated with the user 132 and/or the computing device 102, whether or not the connection 130 that has been requested is authorized for the user 132 and/or the computing device 102. If the connection 130 is authorized, the connection management service 110 can be configured to create the connection 130.

To create the connection 130, the connection management service 110 can be configured to access connection data 114. The connection data 114 can identify, for a particular resource 118, how a connection with that resource 118 is connected. In some embodiments, for example, the connection data 114 can represent, for each connection 130, a workflow or procedure for enabling a connection 130 with that resource 118. By way of example, connection data 114 for a connection 130 with a resource 118 can include a list of operations to be completed to enable the connection 130. The operations can include communications; establishment, dedication, and/or instantiation of network resources; establishment, dedication, and/or instantiation of computing and/or storage resources; requesting of operations by other entities and/or devices; combinations thereof; or the like. The connection management service 110 can be configured to obtain the connection data 114 that is to be used to establish the connection 130, and to perform or request performance of the various operations represented by the connection data 114.

Upon completion of the operations represented by the connection data 114, the connection 130 can be enabled, and the connection management service 110 can communicate information indicating the enablement of the connection 130 to the computing device 102. If, however, the operations cannot be completed for some reason, the connection management service 110 can be configured to elevate the creation of the connection 130 to a third party 136 such as, for example, a device, application, or other entity that can perform the operations to create the connection 130. As used herein, a "third party" refers to a party that is not a resource 118 or a requestor of a connection 130. Once the connection 130 is created, the connection management service 110 can communicate that to the computing device 102 as noted above. It should be understood that this example is illustrative, and therefore should not be construed as being limiting in any way.

According to various embodiments, the third party 136 illustrated and described herein can correspond to an agent that can perform operations to create a requested connection 130 where the connection 130 cannot be created automatically (e.g., by way of performing the various methods illustrated and described herein). Thus, if creation of a connection 130 fails, the third party 136 can be engaged to create the connection 130. Additionally, it should be understood that the agent (or other type of third party 136) may require authority to manipulate a particular connection 130 between resources 118 on behalf of a user 132 or other entity.

Thus, embodiments of the concepts and technologies disclosed herein can include granting the agent or other type of third party 136 a proxy authority. "Proxy authority" as used herein and in the claims refers to the delegation of the authority of the user 132 or other requestor to the agent or other type of third party 136 so that the agent can act on behalf of the user 132 to make changes to the connection 130. In the event that the agent or other third party 136 cannot successfully create the connection 130, embodiments of the concepts and technologies disclosed herein include sending, to the user 132 or other requestor, detailed step-by-step instructions (including explanations of parts that may be needed as well as validation steps that can be performed to confirm the connection 130) that can be used by the user 132 or other entity to effect creation of the connection 130. It should be understood that this example is illustrative, and therefore should not be construed as being limiting in any way.

The connection management service 110 also can be configured to provide, to the computing device 102, information that can identify all connections 130 associated with the computing device 102. Thus, it should be understood that the connection data 114 that is stored at, or accessible by, the server computer 112 can represent connections 130 created using the connection management service 110. In some embodiments, the information associated with some or all of the connections 130 can be keyed on the user 132 and/or the computing device 102 for this and/or other purposes.

For example, the computing device 102 can request connection information from the connection management service 110, and the connection management service 110 can access the connection data 114 to identify all connections 130 associated with the user 132 and/or the computing device 102. Information identifying all of the connections 130 associated with the user 132 and/or the computing device 102 can be sent to the computing device 102 as part of the connection management data 116. The connection management application 108 can present that information to the user 132 or other entity for management purposes and/or for other purposes. It should be understood that this example is illustrative, and therefore should not be construed as being limiting in any way.

In practice, a user 132 or other entity can activate the connection management application 108 that can be executed by the computing device 102. The connection management application 108 can be configured to enable creation of and/or management of a connection 130 between two or more resources 118. As used herein with reference to a connection 130, the term "manage" and/or variants thereof can include viewing the connection 130, changing the connection 130, deleting the connection 130, enabling the connection 130, and/or disabling the connection 130. The connection management application 108, the connection management service 110, the computing device 102, and/or other entities or devices can authenticate the user 132, another entity, and/or the computing device 102.

Once the user 132 or the computing device 102 is authenticated, the connection management application 108 can prompt the user 132 for information identifying one or more of the resources 118 that are to be connected. The connection management application 108 can be used to scan or otherwise obtain an identifier 124 associated with a first resource 118A of the resources 118, and the connection management service 110 can obtain a resource identifier 128 associated with the second resource 118N of the resources 118 from the user 132, from the server computer 112, and/or in other manners.

Via exchanging data with the server computer 112, the connection management application 108 can communicate to the connection management service 110 the identities of one or more of the resources 118 that are to be connected and/or can communicate to the connection management service 110 a particular connection 130 that is to be created between the resources 118. The connection management service 110 can access connection data 114 that can provide operations to be performed to create the desired connection 130. These operations can include, among other things, granting of privileges and/or granting of permissions (e.g., connecting resources 118 together may require implicit or explicit authority, which may be missing in some situations, or may requires resource-specific authorization) that may be required to activate and/or establish connections between specific resources 118.

As such, it can be appreciated that the connection management service 110 can know and/or can determine, for a particular connection 130 between specific resources 118, operations (including granting or changing of permissions) that may be required to establish a connection 130. The connection management service 110 can be configured to perform one or more of the operations and/or request performance of one or more of the operations by other entities to create the connection 130. Information that describes connections 130 associated with the user 132 and/or the computing device 102 can be stored by the connection management service 110, and can be used for various purposes. The connection 130 can be enabled, and the resources 118 can exchange data 122 via the connection 130 for various purposes. In various embodiments, the information that describes various connections 130 associated with a user or the computing device 102 can be communicated to the computing device 102 by the connection management service 110 to enable management (e.g., viewing, changing, deleting, enabling, and/or disabling) of the connections 130.

According to various embodiments of the concepts and technologies disclosed herein, the concepts and technologies disclosed herein can be used to enable a user 132 or other entity to effectively "point" his or her computing device 102 to one or more resources 118, or to use a connection code (e.g., an electronically-provided code; a printed code that may come with hardware and/or software, or the like) to connect resources 118.

During creation of connections 130 as illustrated and described herein, the connection management service 110 can be configured to not only authenticate that the user 132 is entitled to create the connection 130, but also to enforce a maximum security requirement, meaning that all connections 130 created via the connection management service 110 can be negotiated to be as secure as possible unless an override from an authorized entity is entered to suspend the enforcement of this policy. Thus, embodiments of the concepts and technologies disclosed herein can be used to create the most secure connection 130 possible between resources 118 in an autonomous or semi-autonomous fashion. It should be understood that this example is illustrative, and therefore should not be construed as being limiting in any way.

In some embodiments of the concepts and technologies disclosed herein, the creation of the connection 130 can effectively work in reverse. In particular, a user 132 or other entity can have a token that can indicate their authority and their desired connectivity. The resource 118 that is to be connected can have the ability to scan for this token and, upon detection, to establish (via interactions with the connection management service 110), the connection 130. It should be understood that this example is illustrative, and therefore should not be construed as being limiting in any way.

Embodiments of the concepts and technologies disclosed herein also can be used to monitor existing connections 130, thereby enabling billing and/or metering of connections 130, if desired. Also, because databases of necessary operations can be updated regularly, negotiated connections 130 can enable proprietary resources 118 to be connected with other resources 118 with minimal effort on the part of end users and/or network providers. Rather, such operations can be autonomously or semi-autonomously performed. It should be understood that this example is illustrative, and therefore should not be construed as being limiting in any way.

Example use cases can include, for example, security connecting video views into a virtual gaming environment (the video console can be one resource 118 and the gaming server can be the second resource 118); security connecting multiple disparate video views into a security solution; security connecting a computer (e.g., a PC, cloud device, or the like) to a wireless display device; security connecting storage devices, connecting remote consoles to headless devices; providing "invitation only" connection functionality (e.g., only a user in possession of a proper code for a resource 118 can connect to that resource 118); connection to TTY, closed captioning, etc.; connection to language translation services; combinations thereof; or the like.

Resources 118 as illustrated and described herein can include simple and/or complex, physical or virtual devices. These resources 118 therefore can include, for example, simple physical devices, such as speakers, displays, physical storage devices, sensors; simple virtual devices such as chat systems, linear TV, storage services; complex physical devices, such as telepresence endpoints; complex virtual devices, such as telepresence meetings, virtual gaming environments, or the like (e.g., in which these devices can have some aspect of connectivity enabled through Ethernet, WiFi, BLUETOOTH, LTE/5G, or cabling such as USB or HDMI).

According to various embodiments, the resources 118 can have a unique identity, which can be tokenized. Thus, the physical manifestation of a resource 118 can have a visual identifier: 1D/2D bar code, or other encoding schemes; and/or spatial virtual identifiers, including IR, NFC, BLUETOOTH beacons, RFID tags, or the like. A token can encode one or more of a unique identity of the device; the type of device; and aspects of the device.

According to various embodiments, some resources 118 can be aggregated into new virtual services, with aggregate resources offering "meta" aspects. Thus, "resources 118" as used herein can include such "resource aspects" as well.

Resource aspects can have one or more connections or transformations available. Resources 118 may tag resource aspects with preferred connections or transformations to match with other resource aspects for the highest fidelity connections available. If there is no direct aspect matching between resources 118, additional transformation resources 118 can be included in the connection 130.

According to various embodiments, the connection management service 110 can be configured to receive, as input, a token and to return, as output, as much information as is provided or derived for creation of a connection 130. It should be understood that the connections 130 created using the concepts and technologies disclosed herein can be permanent, transient, spatial, or temporal.

In one contemplated embodiment of using the concepts and technologies disclosed herein to create a new connection 130, the two resources 118 being connected include a first telepresence system and a second telepresence systems. The first telepresence system has an identity token, which can include, for example, a printed 2D bar code, which can be printed on the telepresence console of the first telepresence system (the "first telepresence system console"). It should be understood that this example is illustrative, and therefore should not be construed as being limiting in any way.

The second telepresence system also has an identity token, but can be totally software. The token may be in the form of a code in an email, SMS, or other electronic format, for example. The user or host of the conference enters the first telepresence system suite and launches the mobile device application, authenticates to the device (thumbprint or similar) and points the mobile device to the 2D bar code on the first telepresence system console, which is scanned. According to some embodiments, the mobile device may be the initiator by reading the first telepresence system suite ID, or the first telepresence system suite may initiate by scanning the mobile device token as noted above.

According to this example embodiment, the connection management service 110 can validate the user 132, determine that the user 132 is authorized to use the resource (the first telepresence system suite), and can begin the conference. The conference has a variety of aspects that are now available including audio bridge, video bridge, video input, participant management, etc.

The user 132 can receive an electronic code from a participant in the conference (e.g., at the second telepresence system). Participants in second telepresence system may have also logged in, and the second telepresence system can have a series of aspects including audio and video bridge. The mobile device of the user 132 can validate the code, inspect both systems' aspects, identify that both offer and prefer video bridge, as well as the best common codec, and then can offer the user 132 an option to connect the two telepresence systems. Secondary common aspects include audio only bridging. The user 132 can take the default selection, or can choose from other possible combinations, such as only allowing audio to pass between the systems.

FIG. 1 illustrates one computing device 102, one network 104, one server computer 112, two resources 118, and one third party 136. It should be understood, however, that various implementations of the operating environment 100 can include zero, one, or more than one computing device 102; zero, one, or more than one network 104; zero, one, or more than one server computer 112; zero, one, two, or more than two resources 118; and zero, one, or more than one third party 136. As such, the illustrated embodiment should be understood as being illustrative, and should not be construed as being limiting in any way.

Figure 2:
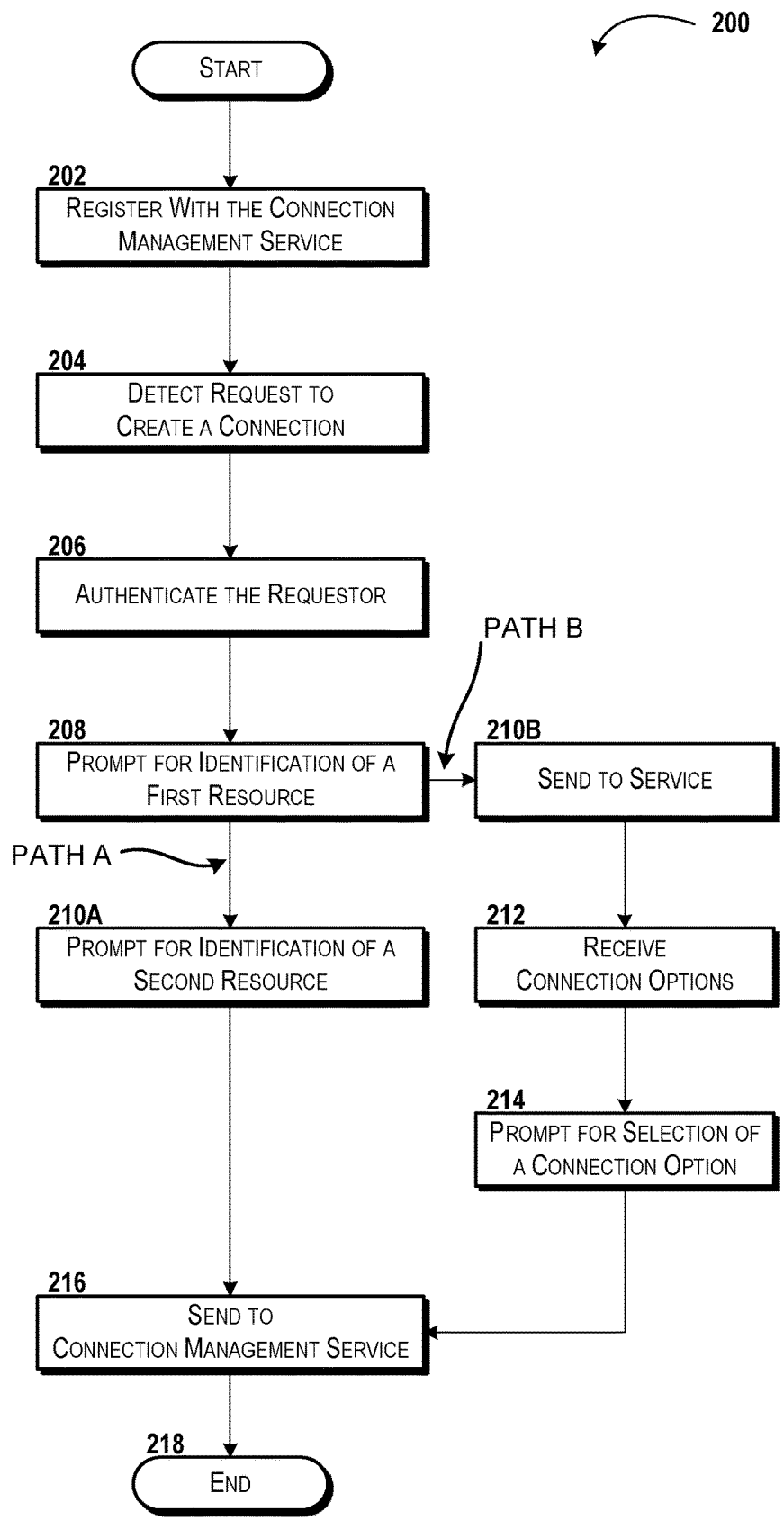
FIG. 2 is a flow diagram showing aspects of a method for creating a connection via interactions with a connection management service, according to an illustrative embodiment of the concepts and technologies described herein.

Turning now to FIG. 2, aspects of a method 200 for creating a connection via interactions with a connection management service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, the server computer 112, and/or the third party 136, to perform one or more operations and/or causing the processor to direct other components of the computing system or device to perform one or more of the operations.

For purposes of illustrating and describing the concepts of the present disclosure, the method 200 is described herein as being performed by the computing device 102 via execution of one or more software modules such as, for example, the connection management application 108. It should be understood that additional and/or alternative devices and/or network nodes can provide the functionality described herein via execution of one or more modules, applications, and/or other software including, but not limited to, the connection management application 108. Thus, the illustrated embodiments are illustrative, and should not be viewed as being limiting in any way.

The method 200 begins at operation 202. At operation 202, the computing device 102 can register with the connection management service 110. According to various embodiments, the computing device 102 can sign up for and/or otherwise register with the connection management service 110 and/or the connection management application 108. Thus, operation 202 can include creating an account with the connection management service 110 and/or the connection management application 108, setting permissions and/or access levels for a user 132 or device such as the computing device 102, or the like. Because registration can occur at any time, it should be understood that in many iterations of the method 200 the operation 202 may be omitted and/or may not occur. Furthermore, it should be understood that operation 202 can be performed by other entities and/or devices and therefore may not be performed by the computing device 102. It should be understood that these examples are illustrative, and therefore should not be construed as being limiting in any way.

From operation 202, the method 200 can proceed to operation 204. At operation 204, the computing device 102 can detect a request to create a connection 130. The request detected in operation 204 can be detected in a number of ways. In some embodiments, activation and/or launching of the connection management application 108 can be understood as corresponding to a request to create a connection 130. In some other embodiments, the connection management application 108 may be activated or launched, and an option may be selected within the application to indicate a request to create a connection 130. In yet other embodiments, interactions with optical indicia and/or other types of media (e.g., RFID tags, NFC devices, etc.) can be interpreted as corresponding to a request to create a connection 130. Thus, it should be understood that any type of request to create a connection 130 can be detected in operation 204 without departing from the scope of this disclosure.

From operation 204, the method 200 can proceed to operation 206. At operation 206, the computing device 102 can authenticate the requestor. According to various embodiments, the requestor can be a user 132 of the computing device 102, though this is not necessarily the case. Thus, operation 206 can correspond to authenticating a user 132 at the computing device 102 by way of verifying a password, matching a biometric of the user 132 to a stored biometric (e.g., facial recognition, fingerprint recognition, retinal scan, or the like), or by communicating with other entities to authenticate the user 132 and/or the computing device 102. Because authentication of users and devices is generally understood, operation 206 will not be further described herein. Also, because authentication of the user 132 or other entity can occur at launching of the connection management application 108 (or at other times), it should be understood operation 206 may be performed before one or more of operations 202-204 and/or at other times. Thus, the illustrated embodiment should be understood as being illustrative and should not be construed as being limiting in any way.

From operation 206, the method 200 can proceed to operation 208. At operation 208, the computing device 102 can prompt for identification of a first resource 118 that is to be part of the connection 130 being requested. According to various embodiments, the identification of the first resource 118 in operation 208 can include an identifier 124. As noted above, the identifier 124 can correspond to identifying information that is obtained from within a proximity 126 of the first resource 118 (e.g., the resource 118A shown in FIG. 1). Thus, the identifier 124 obtained in operation 208 can correspond to visual indicia (that can be photographed and/or scanned by the computing device), visual information that can be manually entered at the computing device 102 by a requestor or other entity, data that can be transmitted by one or more devices (e.g., RFID tags or labels, BLUETOOTH communications, etc.), or the like. Because the identifier 124 can be obtained in additional and/or alternative manners, it should be understood that these examples are illustrative, and therefore should not be construed as being limiting in any way.

According to various embodiments, the first resource 118 can be required by the connection management application 108 and/or the connection management service 110 to be identified by a proximity-based or visual identifier as a way to add a second factor of authentication to the process illustrated and described herein. Namely, this embodiment can add the ability to authenticate the location of the requestor as being in a proximity 126 of the resource 118, which may be helpful in various embodiments. It should be understood that this example is illustrative, and therefore should not be construed as being limiting in any way.

As shown in FIG. 2, the method 200 can proceed along one of two paths from operation 208. In particular, in some embodiments, the method 200 can proceed from operation 208 to operation 210A. At operation 210A, the computing device 102 can prompt for identification of the second resource 118 that is to be a part of the connection 130 being requested. According to various embodiments, a user 132 or other requestor can input, in operation 210A, a resource identifier 128 as illustrated and described above with reference to FIG. 1. Thus, for example, the user 132 or other entity can enter a MAC address, an IP address, an IMSI, an IMEI, a GUID, or other identifying information that can be used to identify the second resource 118 with which the first resource 118 is to communicate. Because the second resource 118 can be identified in additional and/or alternative ways, it should be understood that this example is illustrative, and therefore should not be construed as being limiting in any way. Thus, it can be appreciated that operation 210A can be performed in embodiments of the method 200 in which a requestor identifies two or more resources 118 between which a connection 130 is being requested.

In some other embodiments, in which only a first of the two or more resources 118 is identified, the method 200 can proceed from operation 208 to operation 210B. At operation 210B, the computing device 102 can send the identifier 124 obtained in operation 208 to the connection management service 110. As will be explained in more detail below with reference to FIG. 3, the connection management service 110 can use the identifier 124 received from the computing device 102 to identify one or more resources 118 with which the first resource 118 (identified in operation 208) can communicate. The connection management service 110 can be configured to create one or more options (connection options) that identify a resource 118 with which the resource 118 identified in operation 208 can communicate, and to provide those connection options to the computing device 102. Thus, from operation 210B, the method 200 can proceed to operation 212.

At operation 212, the computing device 102 can receive, from the connection management service 110, one or more connection options. One or more of the connection options obtained in operation 212 can identify a resource 118 with which the resource identified in operation 208 can communicate, as well as one or more functions that can be supported by such connections 130. Thus, operation 212 can correspond to the computing device 102 obtaining one or more resources 118 that can be communicated with and/or one or more purposes for which those one or more resources 118 can be communicated with.

From operation 212, the method 200 can proceed to operation 214. At operation 214, the computing device 102 can prompt for a selection of one of the one or more connection options received in operation 212. In various embodiments, the connection options can be presented at the computing device 102, and operation 214 can correspond to a selection of one of the one or more connection options. It should be understood that this example is illustrative, and therefore should not be construed as being limiting in any way.

From operation 214, the method 200 can proceed to operation 216. The method 200 also can proceed to operation 216 from operation 210A. At operation 216, the computing device 102 can send the information obtained in operations 208-214 to the connection management service 110. Thus, in operation 216 the computing device 102 can send the identifier 124 and the resource identifier 128 to the connection management service 110 (if path A was taken in the method 200), or the selection of the connection option (if path B was taken in the method 200). The information sent to the connection management service 110 in operation 216 can be used by the connection management service 110 to create the connection 130, as will be explained in more detail below with reference to FIG. 3.

Although not shown in FIG. 2, it should be understood from the disclosure herein that the connections 130 associated with a computing device 102 can be managed (e.g., enabled, disabled, deleted, modified). Thus, the method 200 can include additional operations for requesting data that identifies existing connections associated with the user 132 or the computing device 102 from the connection management service 110, presenting the data that identifies existing connections associated with the user 132 or the computing device 102 in a display, and receiving input for enabling, disabling, deleting, and/or modifying the existing connections associated with the user 132 or the computing device 102. Thus, the concepts and technologies disclosed herein can provide a powerful tool for revoking and/or suspending connections for various reasons (e.g., a parent or other entity may be authorized to modify connections for children or other entities and can suspend or delete a particular connection for various purposes). It should be understood that this example is illustrative, and therefore should not be construed as being limiting in any way.

From operation 216, the method 200 can proceed to operation 218. The method 200 can end at operation 218.

Figure 3:
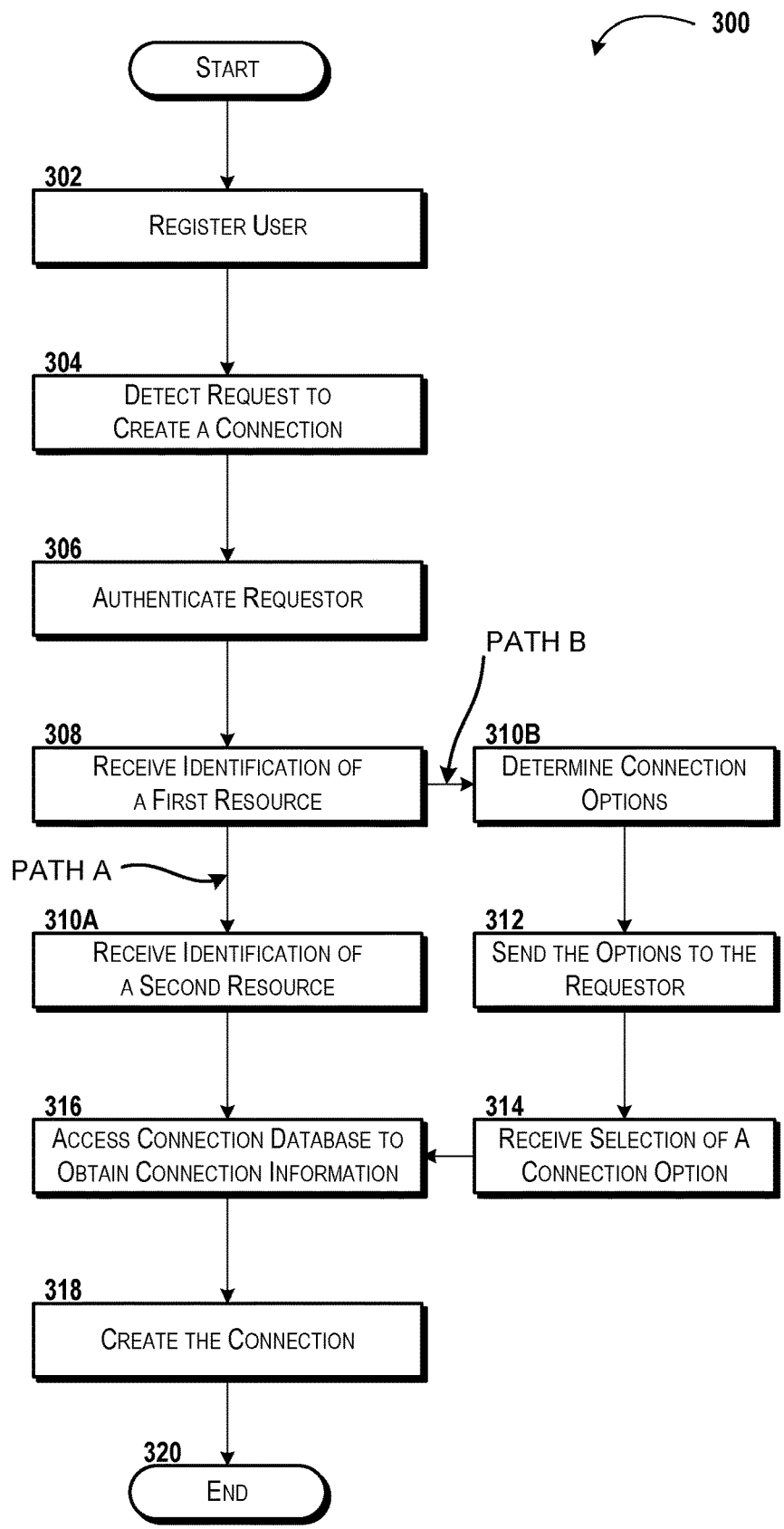
FIG. 3 is a flow diagram showing aspects of a method for creating a connection by a connection management service, according to an illustrative embodiment of the concepts and technologies described herein.

Turning now to FIG. 3, aspects of a method 300 for creating a connection by a connection management service will be described in detail, according to an illustrative embodiment. For purposes of illustrating and describing the concepts of the present disclosure, the method 300 is described herein as being performed by the server computer 112 via execution of one or more software modules such as, for example, the connection management service 110. It should be understood that additional and/or alternative devices and/or network nodes can provide the functionality described herein via execution of one or more modules, applications, and/or other software including, but not limited to, the connection management service 110. Thus, the illustrated embodiments are illustrative, and should not be viewed as being limiting in any way.

The method 300 begins at operation 302. At operation 302, the server computer 112 can register a user 132 or other entity. According to various embodiments, a user 132 or other entity (e.g., the computing device 102) can sign up for and/or otherwise register with the connection management service 110, and thus operation 302 can correspond to the server computer 112 receiving data from the computing device 102 (or other devices or entities) for creating an account with the connection management service 110, setting permissions and/or access levels for a user 132 or device such as the computing device 102, or the like. Because registration can occur at any time, it should be understood that some embodiments of the method 300 can omit operation 302 and/or that operation 302 may be performed at any other time without performing the remainder of the method 300. It should be understood that these examples are illustrative, and therefore should not be construed as being limiting in any way.

From operation 302, the method 300 can proceed to operation 304. At operation 304, the server computer 112 can detect a request to create a connection 130. It can be appreciated from the description of FIGS. 1-2 above that operation 304 can correspond to the server computer 112 receiving information from the computing device 102 such as, for example, the server computer 112 receiving data that identifies one or more of the resources 118 that are to be part of the connection 130 being requested, the server computer 112 receiving information that identifies a specific connection 130 that is requested, or the like. As will be appreciated with reference to operations 308-316, one or more identifiers or other information can be obtained in operation 304.

From operation 304, the method 300 can proceed to operation 306. At operation 306, the server computer 112 can authenticate the requestor associated with the request detected in operation 304. As noted above, the authentication illustrated in operation 306 can be performed by the computing device 102 and/or other devices or entities, and as such, operation 306 can correspond to the server computer 112 determining that the requestor associated with the request detected in operation 304 is authenticated (as opposed to actually performing authentication). Based on the authentication of the requestor, the server computer 112 can determine what connections 130 are available, if a specific requested connection 130 is authorized, and the like. It should be understood that this example is illustrative, and therefore should not be construed as being limiting in any way.

From operation 306, the method 300 can proceed to operation 308. At operation 308, the server computer 112 can receive identification of a first resource 118 that is to be part of the connection 130 being requested. As explained above in detail with reference to FIGS. 1-2, the identification of the first resource 118 can be limited, in some embodiments, to data that is only obtainable in a proximity 126 of the first resource 118 such as a proximity-based transmission or optical input of visual indicia. Such an embodiment can enable addition of a second factor of authentication to the process illustrated and described herein. Namely, using visual or proximity-based information for the identification of the first resource 118 can enable the connection management service 110 to authenticate the location of the requestor as being in a proximity 126 of the resource 118. It should be understood that this example is illustrative, and therefore should not be construed as being limiting in any way.

As shown in FIG. 3, the method 300 can proceed along one of two paths from operation 308. In particular, in some embodiments, the method 300 can proceed from operation 308 to operation 310A. At operation 310A, the server computer 112 can receive, from the computing device 102, an identification of the second resource 118 that is to be a part of the connection 130 being requested. According to various embodiments, a user 132 or other requestor can input a resource identifier 128 and that information can be sent to the server computer 112. Thus, it can be appreciated that operation 310A can be performed in embodiments of the method 300 in which a requestor identifies two or more resources 118 between which a connection 130 is being requested.

In some other embodiments, in which only a first of the two or more resources 118 is identified by the requestor, the method 300 can proceed from operation 308 to operation 310B. At operation 310B, the server computer 112 can determine, based on the identification of the first resource 118, one or more connection options that are available for the requestor (e.g., based on the authentication of the user 132 and/or the computing device 102) and the resource 118 identified in operation 308. Thus, the connection management service 110 can be configured to identify one or more options (connection options) that identify a resource 118 with which the resource 118 identified in operation 308 can communicate.

From operation 310B, the method 300 can proceed to operation 312. At operation 312, the server computer 112 can send the options determined in operation 310B to the requestor (e.g., the computing device 102). One or more of the connection options sent to the requestor (e.g., the computing device 102) in operation 312 can identify a resource 118 with which the resource identified in operation 308 can communicate, as well as one or more functions that can be supported by such connections 130. Thus, operation 312 can correspond to the server computer 112 sending to the computing device 102 information that can identify one or more resources 118 that can be communicated with and/or one or more purposes for which those one or more resources 118 can be communicated with by the resource 118 identified in operation 308.

From operation 312, the method 300 can proceed to operation 314. At operation 314, the server computer 112 can receive, from the requestor (e.g., the computing device 102) communicated with in operation 312, information that identifies a selection of one of the one or more connection options sent to the requestor in operation 312.

From operation 314, the method 300 can proceed to operation 316. The method 300 also can proceed to operation 316 from operation 310A. At operation 316, the server computer 112 can access the connection data 114 to determine how to create (or to request creation of) the connection 130 being requested by the requestor. Thus, as explained above, the server computer 112 can access the connection data 114 to determine what operations are to be performed by the server computer 112 (or requested by the server computer 112) to create the connection 130. In some embodiments, as noted above, the operations can be identified by a workflow or other data structure. In one contemplated embodiment, the workflow or other data structure can specify, for a connection with a resource 118, a first operation, a second operation, and a third operation that are to be performed to create the connection 130. It should be understood that this example is illustrative, and therefore should not be construed as being limiting in any way.

From operation 316, the method 300 can proceed to operation 318. At operation 318, the server computer 112 can create the connection 130. In some embodiments, as can be appreciated from the above description, the server computer 112 can be configured to perform the operations determined in operation 316 and/or can request performance of the operations by other entities. Thus, the server computer 112 can effect creation of or trigger creation of the connection 130, even if the server computer 112 does not directly perform the various operations determined in operation 316.

Although not shown in FIG. 3, it should be understood from the disclosure herein that the connections 130 associated with a computing device 102 can be managed (e.g., enabled, disabled, deleted, modified) via the server computer 112. Thus, the method 300 can include additional operations for providing data that identifies existing connections associated with the user 132 or the computing device 102 to the computing device 102 and receiving input for enabling, disabling, deleting, and/or modifying the existing connections associated with the user 132 or the computing device 102. It should be understood that this example is illustrative, and therefore should not be construed as being limiting in any way.

From operation 318, the method 300 can proceed to operation 320. The method 300 can end at operation 320.

Figure 4A:
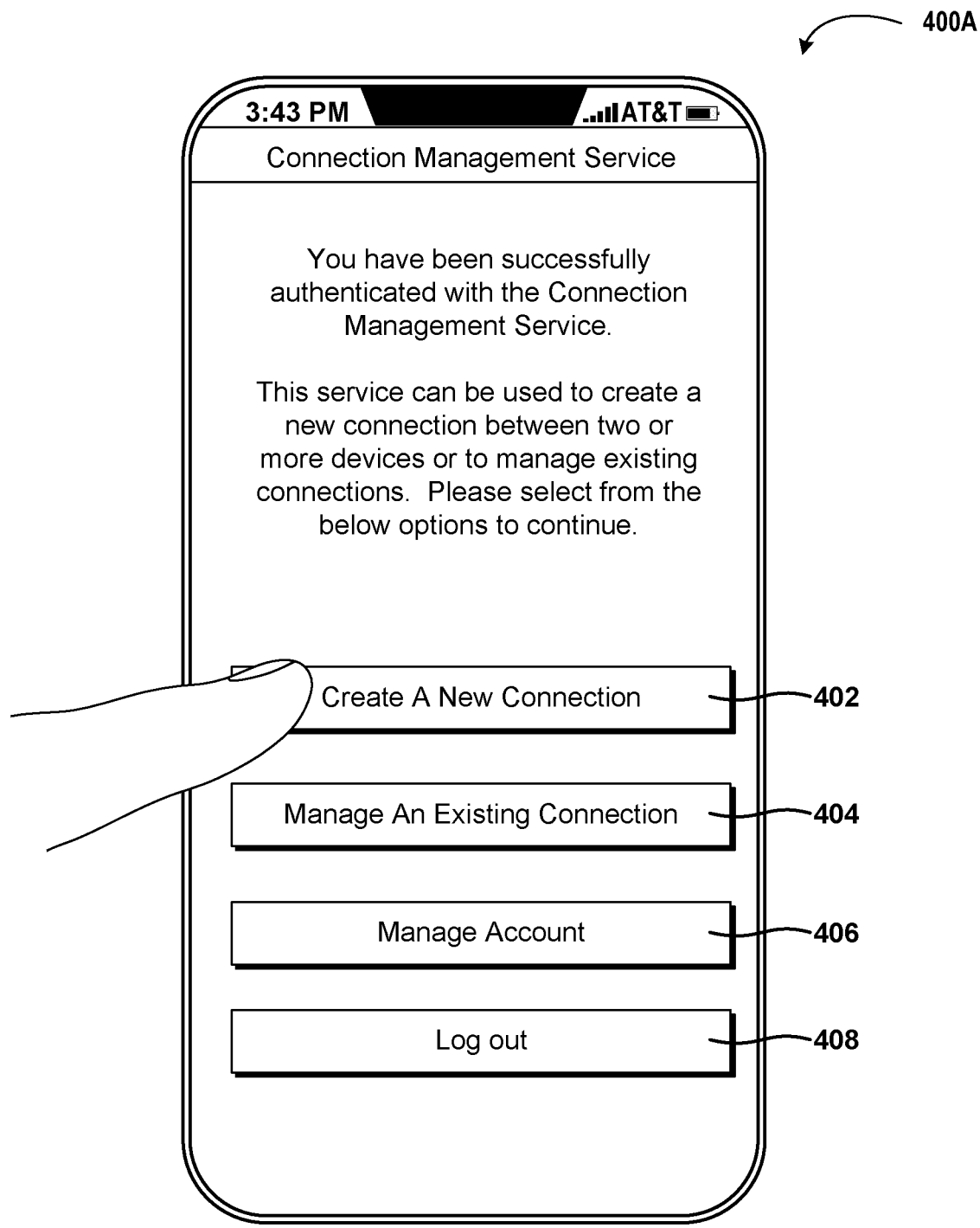
FIGS. 4A-4G are user interface diagrams showing various screen displays for interacting with a connection management service, according to some illustrative embodiments of the concepts and technologies described herein.

FIGS. 4A-4G are user interface ("UI") diagrams showing aspects of UIs for using and/or interacting with the connection management application 108 and/or the connection management service 110, according to some illustrative embodiments. FIG. 4A shows an illustrative screen display 400A. According to some embodiments of the concepts and technologies described herein, the screen display 400A can be generated by a device such as the computing device 102 via interactions with the connection management application 108 and/or the connection management service 110. In particular, according to various embodiments, the computing device 102 can generate the screen display 400A and/or other screen displays in conjunction with and/or based upon interactions with the connection management application 108 described herein, which can be configured to render the screen display 400A using data generated at the computing device 102 and/or using data provided by the connection management service 110 such as, for example, the connection management data 116. It should be appreciated that the UI diagram illustrated in FIG. 4A is illustrative of one contemplated example of the UIs that can be generated and/or displayed in accordance with the concepts and technologies disclosed herein, and therefore should not be construed as being limiting in any way.

According to various embodiments, the screen display 400A can be presented, for example, upon launching or activation of the connection management application 108 at the computing device 102, upon authentication of a user 132 or other entity (e.g., a requestor associated with a connection 130), or the like. In the illustrated embodiment shown in FIG. 4A, the screen display 400A is presented in a configuration that may correspond to a display that can be provided after authentication of the requestor with the connection management application 108, the connection management service 110, the computing device 102, and/or other entities. Because the screen display 400A illustrated in FIG. 4A can be displayed at additional and/or alternative times, it should be understood that these examples are illustrative and therefore should not be construed as being limiting in any way.

The screen display 400A can include various menus and/or menu options (not shown in FIG. 4A) or multiple controls for performing various functionality associated with the connection management application 108 and/or the connection management service 110. In the illustrated embodiment, the screen display 400A includes a user interface ("UI") control 402, a UI control 404, a UI control 406, and a UI control 408.

The UI control 402 can be selectable to begin a process flow to create a new connection 130 between two or more resources 118. Thus, it can be appreciated that selection of the UI control 402 can cause the computing device 102 (e.g., via execution of the connection management application 108) to begin one or more process flows for interacting with a connection management service 110 to create a new connection 130 between two or more resources 118. By way of example, and not limitation, selection of the UI control 402 can prompt the computing device 102 to begin performance of some or all of the operations illustrated in FIG. 2 with respect to the method 200. It should be understood that this example is illustrative, and therefore should not be construed as being limiting in any way.

The UI control 404 can be selectable to begin a process flow for managing (e.g., enabling, disabling, deleting, and/or modifying) an existing connection 130. As such, selection of the UI control 404 can cause the computing device 102 (e.g., via execution of the connection management application 108) to request connection information from the connection management service 110. It can be appreciated from the above description that the computing device 102 can also be configured (e.g., via execution of the connection management application 108) to present the existing connections 130 for various operations. It should be understood that this example is illustrative, and therefore should not be construed as being limiting in any way.

The UI control 406 can be selectable to begin a process flow for managing an account associated with the user 132 and/or the computing device 102. Thus, selection of the UI control 404 can cause the computing device 102 to connect to the connection management service 110 to perform various account operations such as delegating control to other users, suspending delegated controls, adding new devices and/or resources 118 to an account, changing authentication information, combinations thereof, or the like. The UI control 408 can be selectable to log out of the connection management application 108 and/or the connection management service 110. Thus, selection of the UI control 408 can cause the computing device 102 to hide the screen display 400A and/or to exit the connection management application 108 altogether. Because additional or alternative controls can be included in the screen display 400A, it should be understood that the example embodiment shown in FIG. 4A is illustrative and therefore should not be construed as being limiting in any way.

Figure 4B:
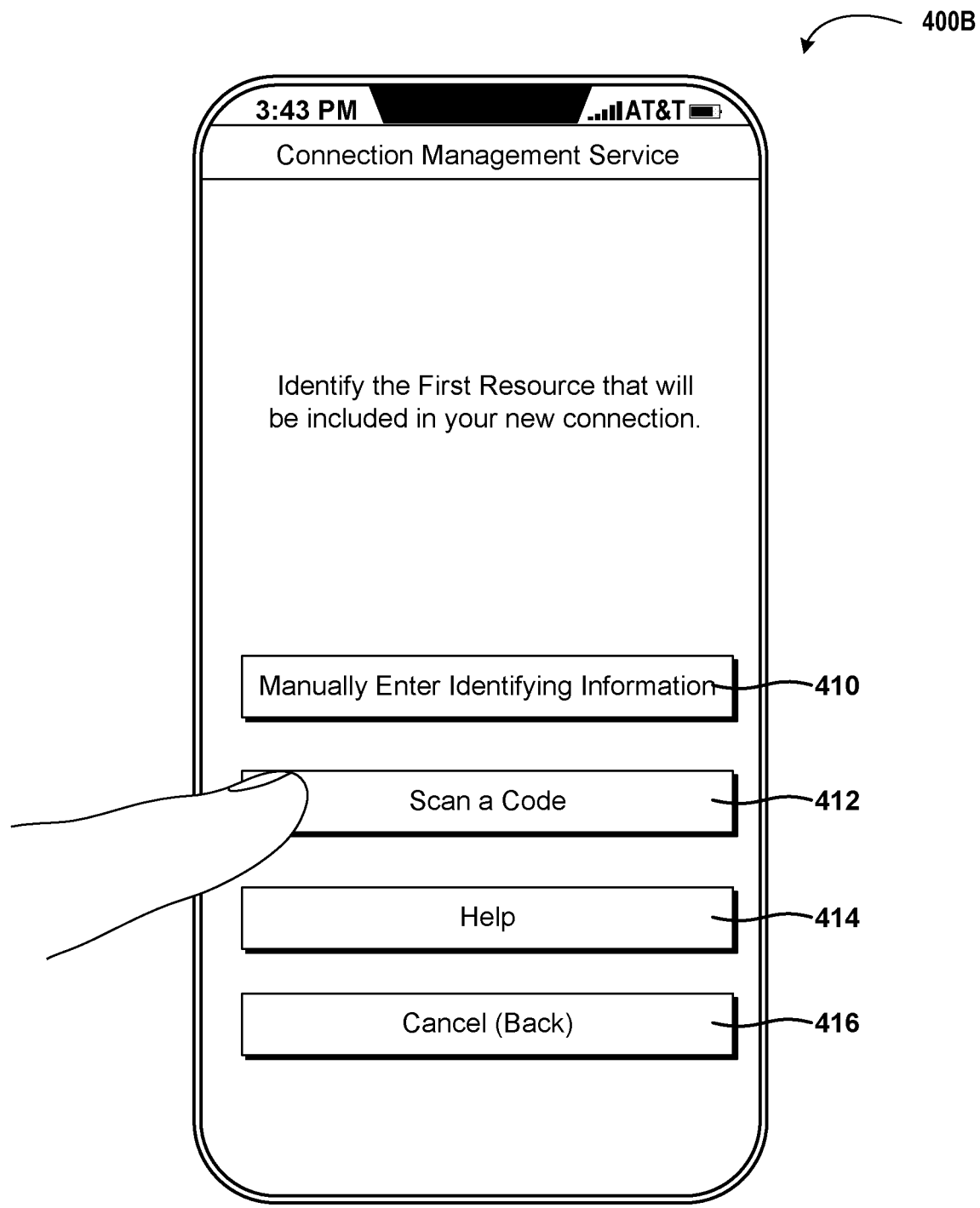

FIG. 4B shows an illustrative screen display 400B. According to some embodiments of the concepts and technologies described herein, the screen display 400B can be generated by a device such as the computing device 102 via interactions with the connection management application 108 and/or the connection management service 110. In particular, according to various embodiments, the computing device 102 can generate the screen display 400B and/or other screen displays in conjunction with and/or based upon interactions with the connection management application 108 described herein, which can be configured to render the screen display 400B using data generated at the computing device 102 and/or using data provided by the connection management service 110 such as, for example, the connection management data 116. It should be appreciated that the UI diagram illustrated in FIG. 4B is illustrative of one contemplated example of the UIs that can be generated and/or displayed in accordance with the concepts and technologies disclosed herein, and therefore should not be construed as being limiting in any way.

According to various embodiments, the screen display 400B can be presented, for example, upon selection of the UI control 402 illustrated and described above with reference to FIG. 4A. Because the screen display 400B illustrated in FIG. 4B can be displayed at additional and/or alternative times, it should be understood that these examples are illustrative and therefore should not be construed as being limiting in any way.

The screen display 400B includes a UI control 410, a UI control 412, a UI control 414, and a UI control 416. The UI control 410 can be selectable to enable manual entry of an identifier 124 associated with a resource 118. Thus, for example, selection of the UI control 410 can cause the computing device 102 to present a text field and a keyboard display via which text can be entered to identify the resource 118 for which a connection 130 is being created. It should be understood that this example is illustrative, and therefore should not be construed as being limiting in any way.

The UI control 412 can be selectable to begin a process for scanning optical or visual indicia using the computing device 102. Thus, for example, selection of the UI control 412 can cause the computing device 102 (e.g., via execution of the connection management application 108) to launch a camera application to capture visual indicia that can identify the resource 118 for which a connection 130 is being created. It should be understood that this example is illustrative, and therefore should not be construed as being limiting in any way.

The UI control 414 can be selectable to launch a help screen and/or to connect to a help agent, and the UI control 416 can be selectable to cancel creation of the new connection 130. While the UI control 416 indicates that cancelling creation of the new connection 130 will trigger presentation of a previous display such as the screen display 400A, it should be understood that this is not necessarily the case. Thus, selection of the UI control 416 can cause the computing device 102 to hide the screen display 400B, to present the screen display 400A or other screen displays, and/or to exit the connection management application 108 altogether. Because additional or alternative controls can be included in the screen display 400B, it should be understood that the example embodiment shown in FIG. 4B is illustrative and therefore should not be construed as being limiting in any way.

Figure 4C:
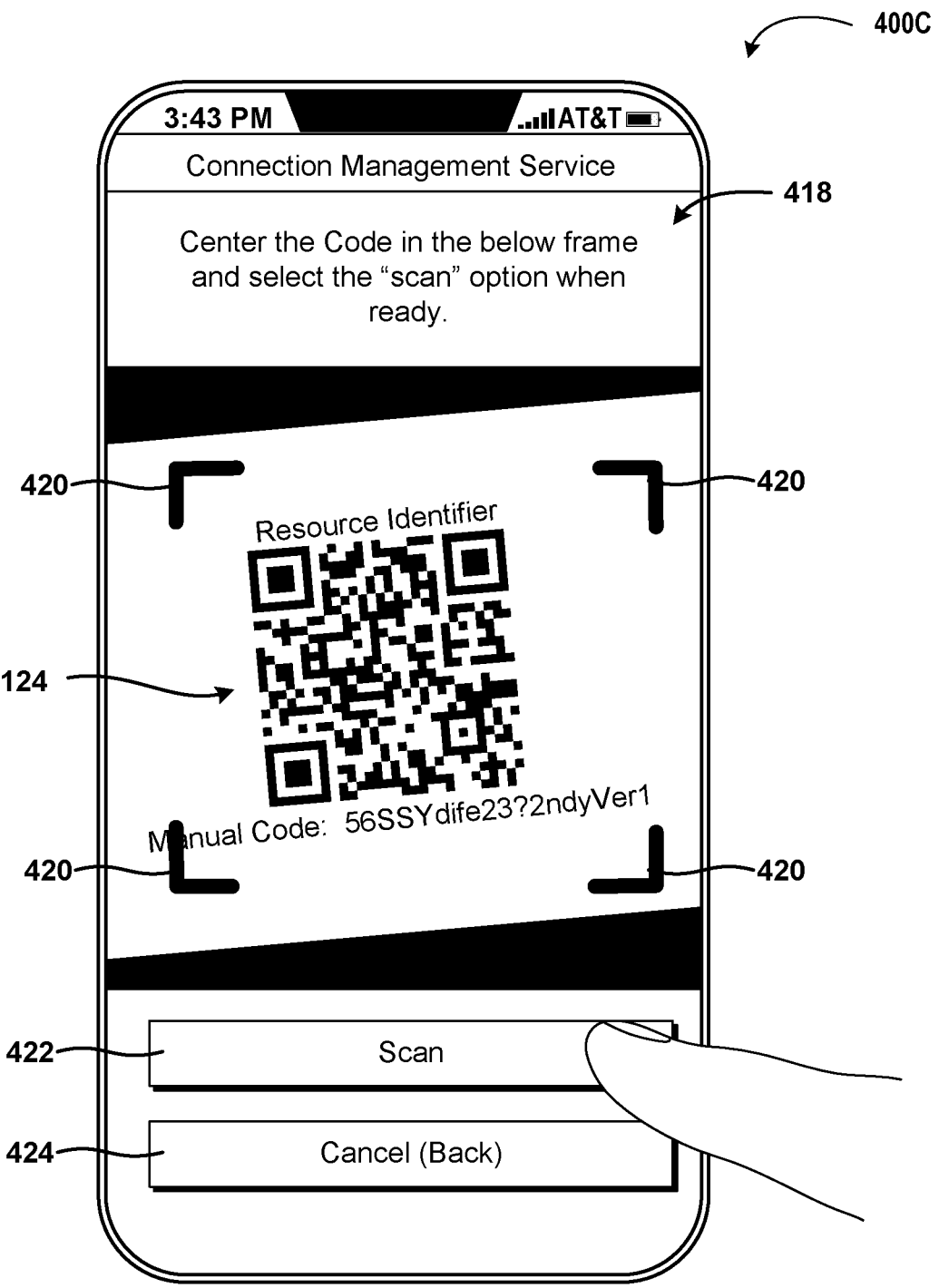

FIG. 4C shows an illustrative screen display 400C that can be generated by a device such as the computing device 102 via interactions with the connection management application 108 and/or the connection management service 110. In particular, according to various embodiments, the computing device 102 can generate the screen display 400C and/or other screen displays in conjunction with and/or based upon interactions with the connection management application 108 described herein, which can be configured to render the screen display 400C using data generated at the computing device 102 and/or using data provided by the connection management service 110 such as, for example, the connection management data 116. It should be appreciated that the UI diagram illustrated in FIG. 4C is illustrative of one contemplated example of the UIs that can be generated and/or displayed in accordance with the concepts and technologies disclosed herein, and therefore should not be construed as being limiting in any way.

According to various embodiments, the screen display 400C can be presented, for example, upon selection of the UI control 412 illustrated and described above with reference to FIG. 4B. Because the screen display 400C illustrated in FIG. 4C can be displayed at additional and/or alternative times, it should be understood that these examples are illustrative and therefore should not be construed as being limiting in any way.

The screen display 400C includes a scan screen 418. The scan screen 418 can be launched by the computing device 102 to provide a user friendly display for capturing visual indicia as illustrated and described herein. As shown in FIG. 4C, the scan screen 418 can include one or more frame identifiers 420. The frame identifiers 420 can be omitted in various embodiments or substituted for other types or shapes of frames (e.g., one or more squares, one or more circles, other shapes, dots, etc.). Because displays for scanning visual indicia are generally understood, this aspect of the screen display 400C is not described in further detail with reference to FIG. 4C.

As shown in FIG. 4C, the screen display 400C also can include a UI control 422 and a UI control 424. The UI control 422 can be selectable to cause the computing device 102 to capture a current view of the camera of the computing device 102. Thus, for example, selection of the UI control 422 can cause the computing device 102 to capture a current view of the camera of the computing device 102 and to use the resulting image for various reasons (e.g., either to analyze the image to extract information such as identifiers and the like), to upload the image to other entities, combinations thereof, or the like. It should be understood that this example is illustrative, and therefore should not be construed as being limiting in any way.

The UI control 424 can be selectable to cancel capturing of visual information. While the UI control 424 indicates that cancelling capturing of the visual information will trigger presentation of a previous display such as the screen display 400B, it should be understood that this is not necessarily the case. Thus, selection of the UI control 424 can cause the computing device 102 to hide the screen display 400C, to present other screen displays, and/or to exit the connection management application 108 altogether. Because additional or alternative controls can be included in the screen display 400C, it should be understood that the example embodiment shown in FIG. 4C is illustrative and therefore should not be construed as being limiting in any way.

Figure 4D:
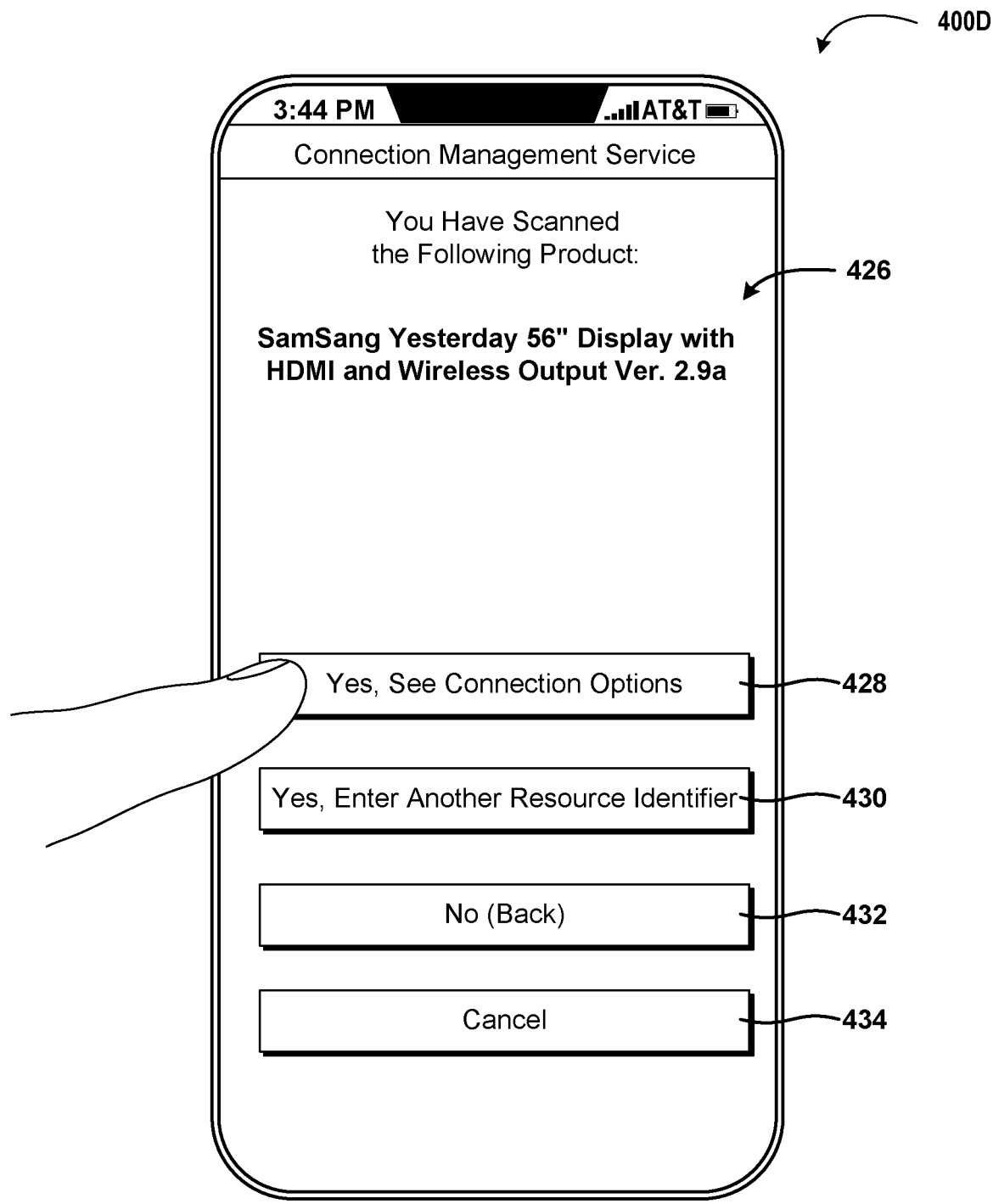

FIG. 4D shows an illustrative screen display 400D that can be generated by a device such as the computing device 102 via interactions with the connection management application 108 and/or the connection management service 110. In particular, according to various embodiments, the computing device 102 can generate the screen display 400D and/or other screen displays in conjunction with and/or based upon interactions with the connection management application 108 described herein, which can be configured to render the screen display 400D using data generated at the computing device 102 and/or using data provided by the connection management service 110 such as, for example, the connection management data 116. It should be appreciated that the UI diagram illustrated in FIG. 4D is illustrative of one contemplated example of the UIs that can be generated and/or displayed in accordance with the concepts and technologies disclosed herein, and therefore should not be construed as being limiting in any way.

As shown in FIG. 4D, the screen display 400D can include a resource identification feedback area 426, which can indicate a resource 118 that has been identified as part of the creation of a new connection 130 (or at other times). The resource identification feedback area 426 can be populated with information in various formats that may be human readable or may not be human readable (or human interpretable). Thus, for example, the resource identification feedback area 426 can provide an identifier of a resource 118 for which a connection 130 is being created in various formats such as a product identifier, a GUID or other string, a photograph of the product, combinations thereof, or the like. It therefore should be understood that the description of the resource 118 as shown in the screen display 400D is merely illustrative and should not be construed as being limiting in any way.

As shown in FIG. 4D, the screen display 400D also can include a UI control 428, a UI control 430, a UI control 432, and a UI control 434. The UI control 428 can be selectable to cause the computing device 102 to present connection options. As explained above, particularly with reference to FIGS. 1-3, connection options can be generated by the connection management service 110 based on either the identity of the first resource 118 (e.g., the resource 118A shown in FIG. 1) or based on the identities of multiple resources 118 (e.g., the identities of the resources 118A-N in FIG. 1). Thus, selection of the UI control 428 can cause the computing device 102 to interact with the connection management service 110 to obtain one or more connection options for the first resource 118 identified by the requestor using the connection management application 108. Such operations could correspond, for example, to the computing device 102 performing operations 210B-212 of the method 200 and the server computer 112 performing operations 310B-312 of the method 300. Because the connection options can be created and/or obtained in other manners, it should be understood that this example is illustrative, and therefore should not be construed as being limiting in any way.

The UI control 430 can be selectable to cause the computing device 102 to obtain an identifier associated with another resource 118. Thus, for example, selection of the UI control 430 can cause the computing device 102 to present a text field and a keyboard display via which text can be entered to identify the resource 118 for which a connection 130 is being created; to launch another scan screen such as that illustrated and described above with reference to FIG. 4C; to communicate with other devices or entities to obtain another identifier; combinations thereof; or the like. It should be understood that this example is illustrative, and therefore should not be construed as being limiting in any way.

The UI control 432 can be selectable to indicate that the resource 118 identified in the resource identification feedback area 426 is incorrect. While the illustrated UI control 432 indicates that indicating that the resource 118 identified in the resource identification feedback area 426 is incorrect will trigger presentation of a previous display such as the screen display 400C, it should be understood that this is not necessarily the case. Thus, selection of the UI control 432 can cause the computing device 102 to hide the screen display 400D, to present other screen displays, and/or to exit the connection management application 108 altogether. The UI control 434 can be selectable to cancel creation of the new connection 130. Because additional or alternative controls can be included in the screen display 400D, it should be understood that the example embodiment shown in FIG. 4D is illustrative and therefore should not be construed as being limiting in any way.

Figure 4E:
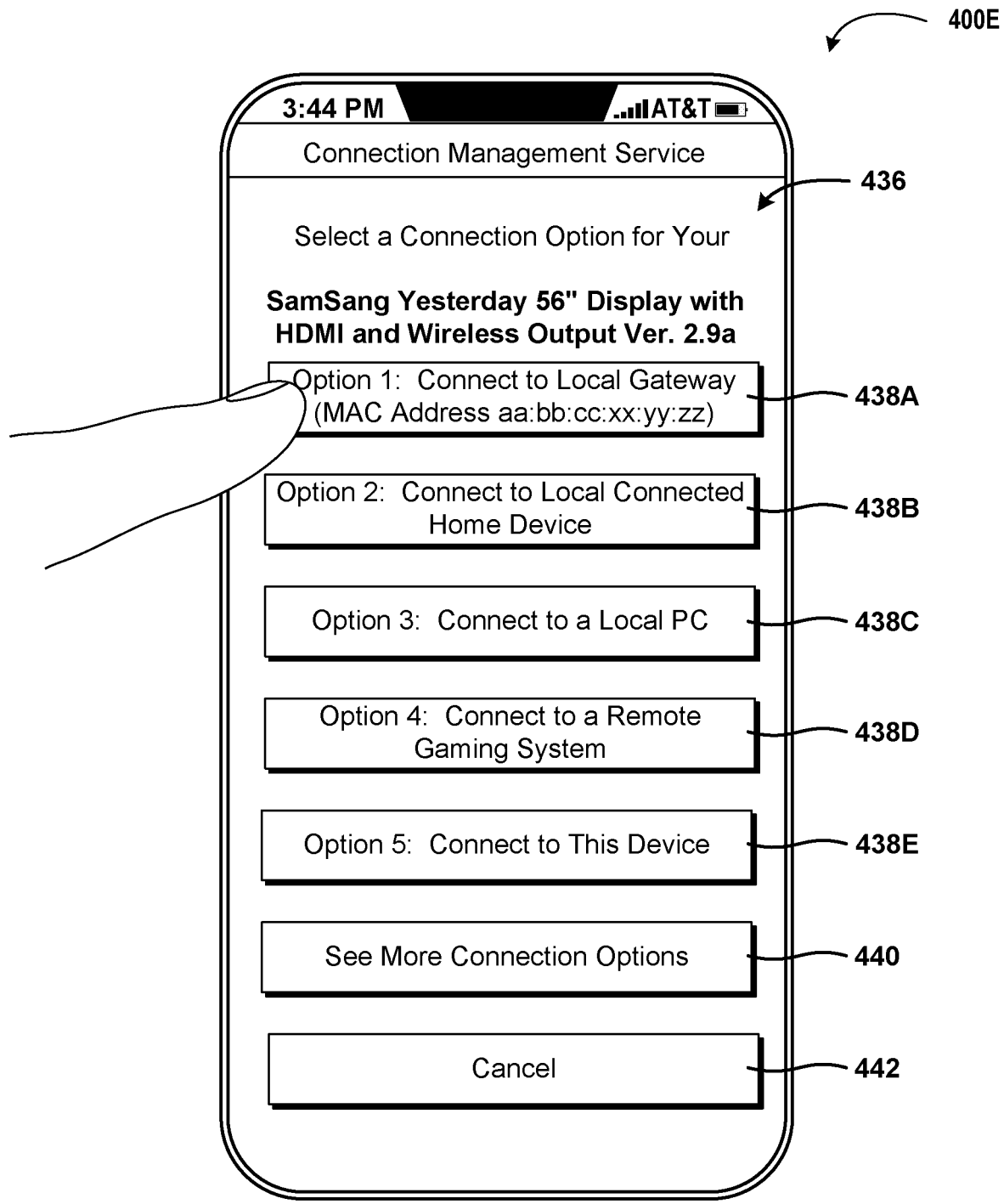

FIG. 4E shows an illustrative screen display 400E that can be generated by a device such as the computing device 102 via interactions with the connection management application 108 and/or the connection management service 110. In particular, according to various embodiments, the computing device 102 can generate the screen display 400E and/or other screen displays in conjunction with and/or based upon interactions with the connection management application 108 described herein, which can be configured to render the screen display 400E using data generated at the computing device 102 and/or using data provided by the connection management service 110 such as, for example, the connection management data 116. It should be appreciated that the UI diagram illustrated in FIG. 4E is illustrative of one contemplated example of the UIs that can be generated and/or displayed in accordance with the concepts and technologies disclosed herein, and therefore should not be construed as being limiting in any way.

According to various embodiments, the screen display 400E can be presented, for example, upon selection of the UI control 428 illustrated and described above with reference to FIG. 4D. Because the screen display 400E illustrated in FIG. 4E can be displayed at additional and/or alternative times, it should be understood that these examples are illustrative and therefore should not be construed as being limiting in any way.

The screen display 400E includes a connection option selection screen 436. The connection option selection screen 436 can be launched by the computing device 102 to provide a list showing the connection options available for the resource 118 initially entered by the user 132 or other entity (e.g., via the scan screen 418 illustrated and described above with reference to FIG. 4C). As shown in FIG. 4E, the connection option selection screen 436 can include one or more connection selection controls 438A-E (hereinafter collectively and/or generically referred to as "connection selection controls 438"). The connection selection controls 438 can correspond to UI controls that, when selected, cause the computing device 102 to send, to the connection management service 110, an indication of a specific connection (as indicated by the text on the selected connection selection control 438) that is desired. Thus, for example, if the connection selection control 438A is selected, the computing device 102 can send, to the connection management service 110, an indication that the connection 130 being requested is between a display and a local gateway. It should be understood that this example is illustrative, and therefore should not be construed as being limiting in any way.

As shown in FIG. 4E, the screen display 400E also can include a UI control 440 and a UI control 442. The UI control 440 can be selectable to cause the computing device 102 to display additional connection selection controls 438 (in the event that additional connections 130 are available for the identified resource 118). Thus, selection of the UI control 440 can cause the computing device 102 to display additional connection selection controls 438 that can be selected as explained above. The UI control 442 can be selectable to cancel creation of the new connection 130. Because additional or alternative controls can be included in the screen display 400E, it should be understood that the example embodiment shown in FIG. 4E is illustrative and therefore should not be construed as being limiting in any way.

Figure 4F:
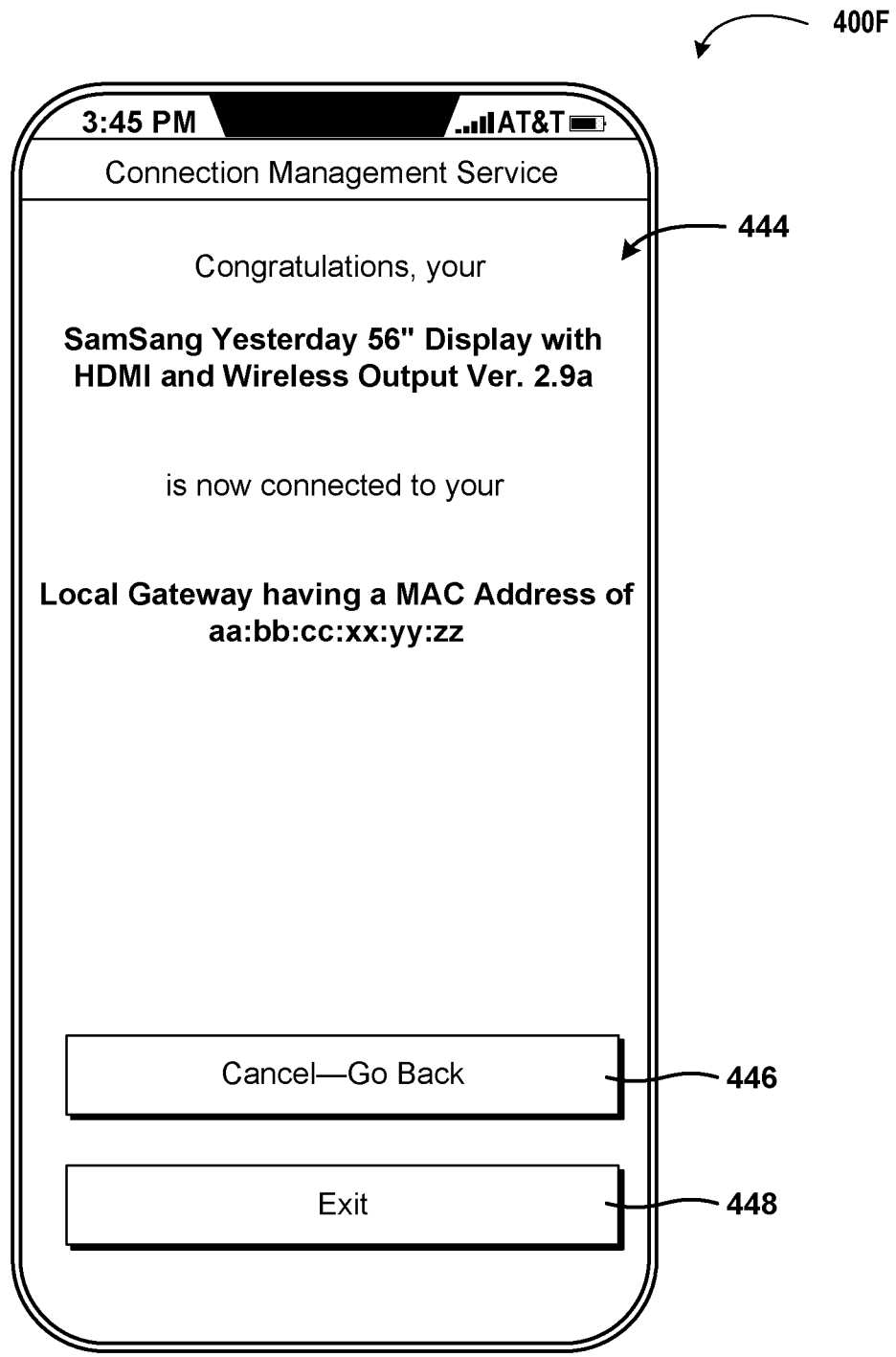

FIG. 4F shows an illustrative screen display 400F that can be generated by a device such as the computing device 102 via interactions with the connection management application 108 and/or the connection management service 110. In particular, according to various embodiments, the computing device 102 can generate the screen display 400F and/or other screen displays in conjunction with and/or based upon interactions with the connection management application 108 described herein, which can be configured to render the screen display 400F using data generated at the computing device 102 and/or using data provided by the connection management service 110 such as, for example, the connection management data 116. It should be appreciated that the UI diagram illustrated in FIG. 4F is illustrative of one contemplated example of the UIs that can be generated and/or displayed in accordance with the concepts and technologies disclosed herein, and therefore should not be construed as being limiting in any way.

According to various embodiments, the screen display 400F can be presented, for example, upon selection of the connection selection control 438A illustrated and described above with reference to FIG. 4E. Because the screen display 400F illustrated in FIG. 4F can be displayed at additional and/or alternative times, it should be understood that these examples are illustrative and therefore should not be construed as being limiting in any way.

The screen display 400F includes a connection verification screen 444. The connection verification screen 444 can be launched by the computing device 102 to provide a confirmation of a new connection 130 that has been created. Of course, it should be understood that a display that is substantially similar to the connection verification screen 444 can be displayed if an existing connection 130 is modified or otherwise changed in accordance with the various embodiments of the concepts and technologies disclosed herein. As such, the illustrated embodiment is illustrative and should not be construed as being limiting in any way.

As shown in FIG. 4F, the connection verification screen 444 indicates the two resources that are being connected via the newly created connection 130. A user 132 or other entity can use the connection verification screen 444 to verify the new connection 130, if desired. The screen display 400F also can include a UI control 446 and a UI control 448. The UI control 446 can be selectable to indicate that something in the connection verification screen 444 is inaccurate, thereby causing the computing device 102 to return to a previous screen to select a different connection option, if desired. Selection of the UI control 446 can cause the computing device 102 to again display the connection selection controls 438, if desired. The UI control 448 can be selectable to confirm creation of the new connection 130. Selection of the UI control 448 can cause the computing device 102 to exit the connection creation process, if desired, or to take other actions such as sending confirmation to the connection management service 110, or the like. Because additional or alternative controls can be included in the screen display 400F, it should be understood that the example embodiment shown in FIG. 4F is illustrative and therefore should not be construed as being limiting in any way.

Figure 4G:
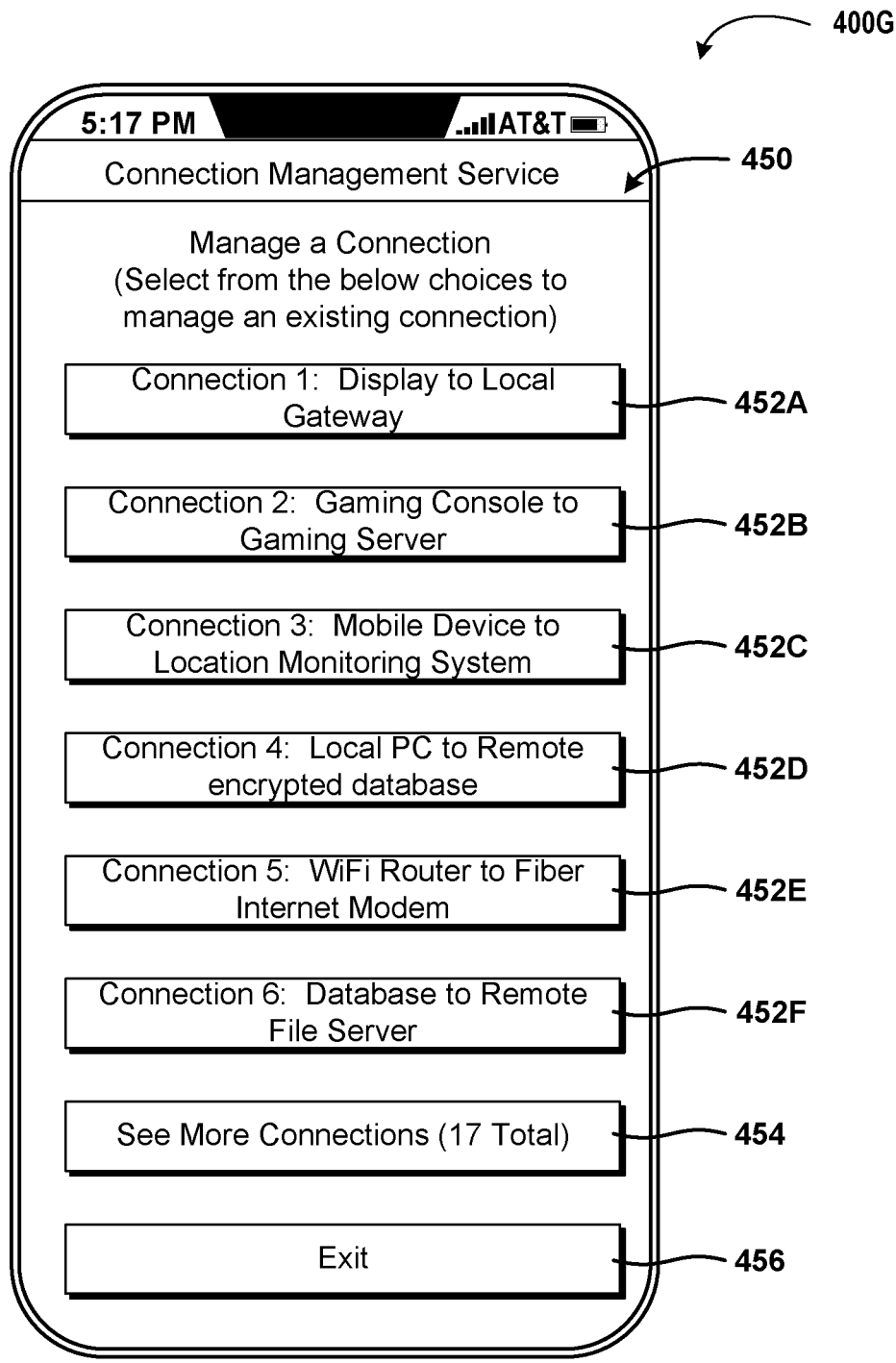

FIG. 4G shows an illustrative screen display 400G that can be generated by a device such as the computing device 102 via interactions with the connection management application 108 and/or the connection management service 110. In particular, according to various embodiments, the computing device 102 can generate the screen display 400G and/or other screen displays in conjunction with and/or based upon interactions with the connection management application 108 described herein, which can be configured to render the screen display 400G using data generated at the computing device 102 and/or using data provided by the connection management service 110 such as, for example, the connection management data 116. It should be appreciated that the UI diagram illustrated in FIG. 4G is illustrative of one contemplated example of the UIs that can be generated and/or displayed in accordance with the concepts and technologies disclosed herein, and therefore should not be construed as being limiting in any way.

According to various embodiments, the screen display 400G can be presented, for example, upon selection of the UI control 404 illustrated and described above with reference to FIG. 4A. Because the screen display 400G illustrated in FIG. 4G can be displayed at additional and/or alternative times, it should be understood that these examples are illustrative and therefore should not be construed as being limiting in any way.

The screen display 400G includes an existing connection management screen 450. The existing connection management screen 450 can be launched by the computing device 102 to provide a list showing existing connections 130 associated with the user 132, the computing device 102, and/or other entities. As shown in FIG. 4G, the existing connection management screen 450 can include one or more connection management controls 452A-F (hereinafter collectively and/or generically referred to as "connection management controls 452"). The connection management controls 452 can correspond to UI controls that, when selected, cause the computing device 102 to obtain details associated with an existing connection 130, and to present options for modifying, enabling, disabling, deleting, or otherwise changing an existing connection 130 configured through and/or managed by the connection management application 108 and/or the connection management service 110. Thus, for example, if the connection management control 452A is selected, the computing device 102 can obtain, from the connection management service 110, details associated with the connection 130 indicated by the text on the connection management control 452A. It should be understood that this example is illustrative, and therefore should not be construed as being limiting in any way.

As shown in FIG. 4G, the screen display 400G also can include a UI control 454 and a UI control 456. The UI control 454 can be selectable to cause the computing device 102 to display additional connection management controls 452 (in the event that additional connections 130 exist). Thus, selection of the UI control 454 can cause the computing device 102 to display additional connection management controls 452 that can be selected to manage the associated connections 130 as explained above. The UI control 456 can be selectable to exit the connection management screen 450. Because additional or alternative controls can be included in the screen display 400G, it should be understood that the example embodiment shown in FIG. 4G is illustrative and therefore should not be construed as being limiting in any way.

Figure 5:
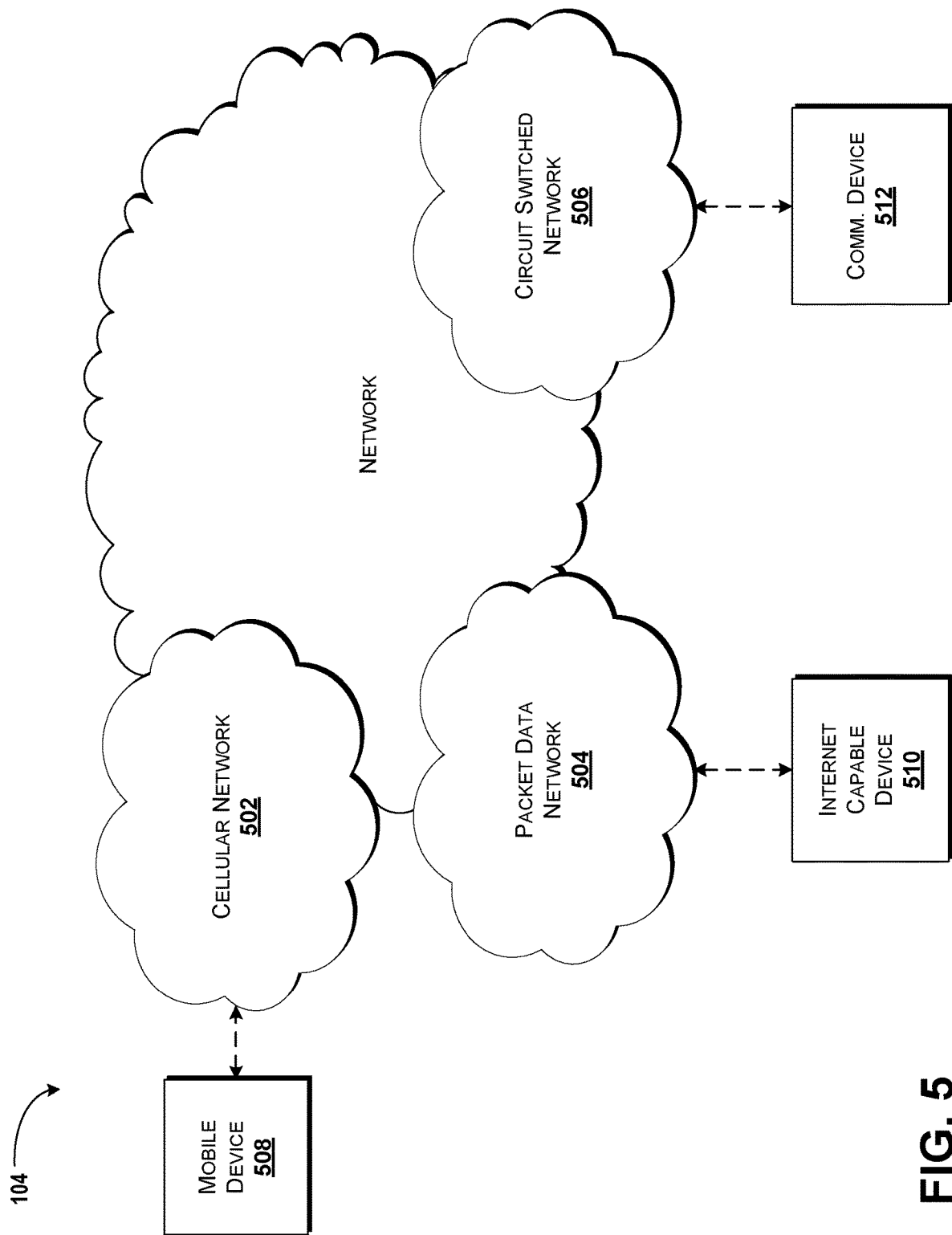
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
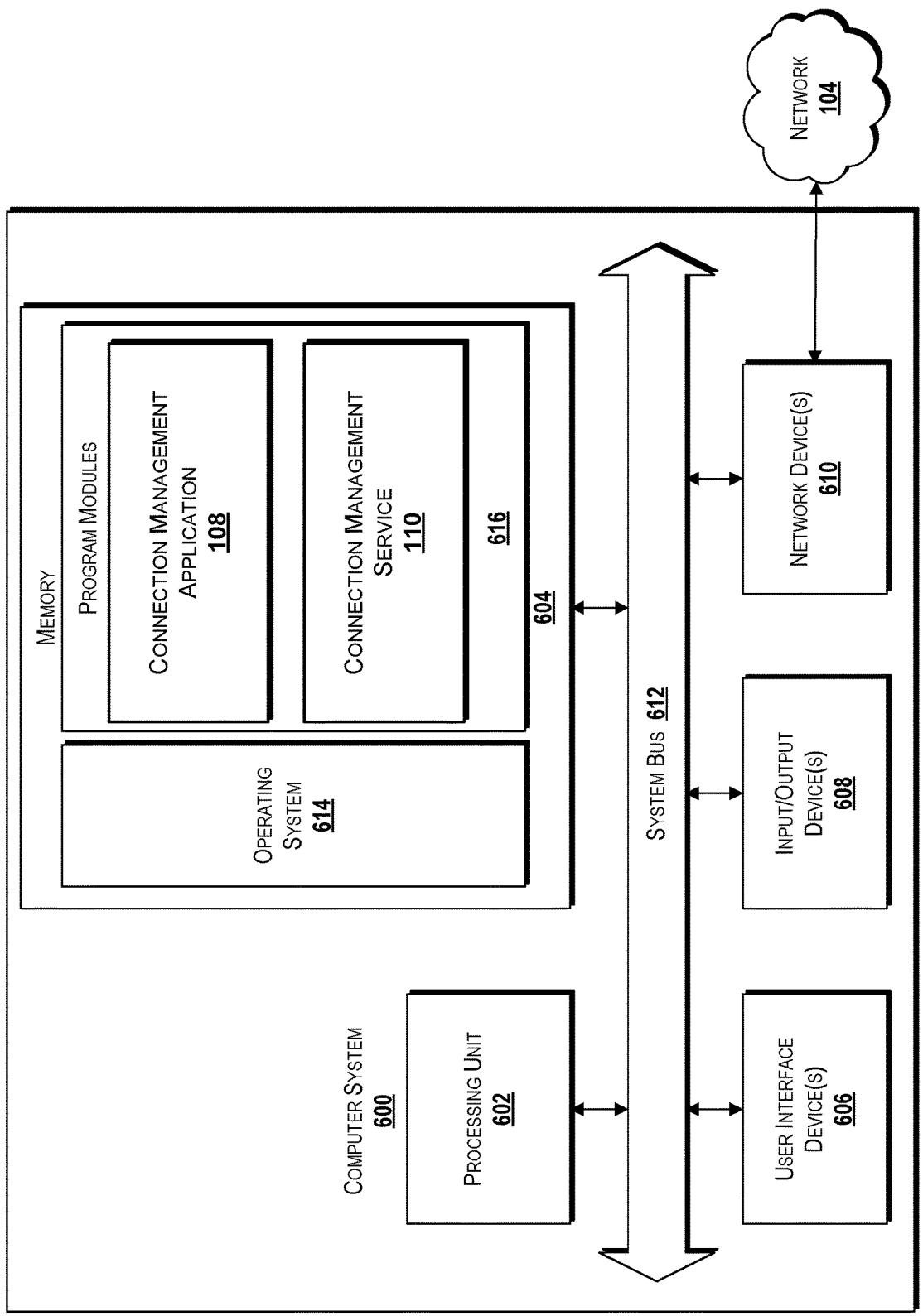
FIG. 6 is a block diagram illustrating an example computer system configured to provide and/or interact with a connection management service, according to some illustrative embodiments of the concepts and technologies described herein.

FIG. 6 is a block diagram illustrating a computer system 600 configured to provide the functionality described herein for providing and/or interacting with a connection management service 110, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the connection management application 108 and/or the connection management service 110. These and/or other programs can be embodied in computer-readable media containing instructions that, when executed by the processing unit 602, perform one or more of the methods 200 or 300 described in detail above with respect to FIGS. 2-3 and/or other functionality as illustrated and described herein. It can be appreciated that, at least by virtue of the instructions embodying the methods 200 or 300 and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the connection data 114, the connection management data 116, the data 122, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
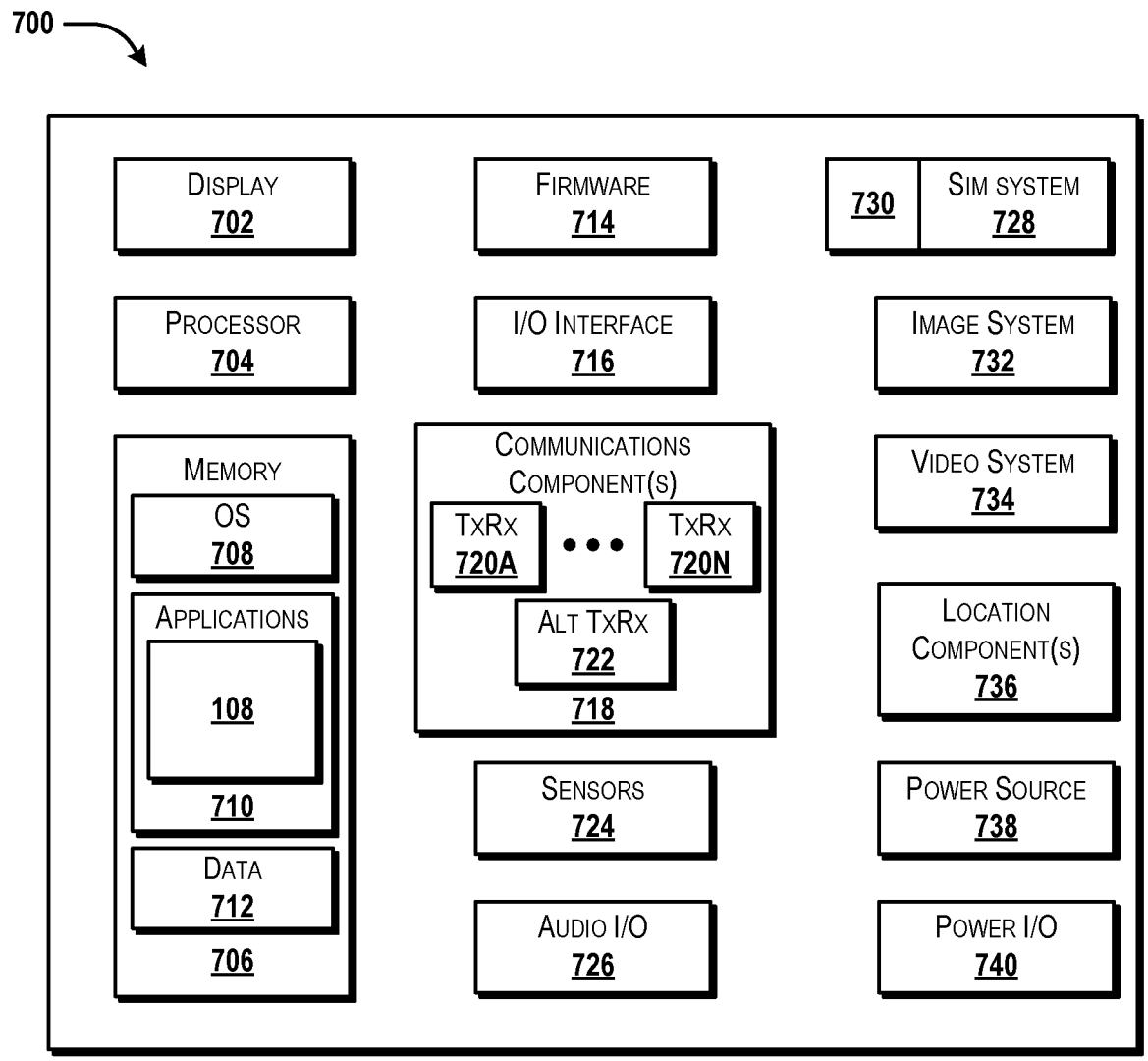
FIG. 7 is a block diagram illustrating an example mobile device configured to interact with a connection management service, according to some illustrative embodiments of the concepts and technologies described herein.

Turning now to FIG. 7, an illustrative mobile device 700 and components thereof will be described. In some embodiments, the computing device 102 described above with reference to FIGS. 1-5 can be configured as and/or can have an architecture similar or identical to the mobile device 700 described herein in FIG. 7. It should be understood, however, that the computing device 102 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, connection information, account information, the various user interfaces shown in FIGS. 4A-4G, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the connection management application 108, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, entering identification information for one or more resources 118, scanning visual indicia associated with resources 118, obtaining connection information, selecting connections 130, configuring connections 130, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the connection management application 108 and/or the connection management data 116, other data, other applications, and/or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, connection data 114, connection management data 116, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSDPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Turning now to FIG. 8, a cloud computing platform 800 capable of implementing aspects of the concepts and technologies disclosed herein will be described, according to an illustrative embodiment. In some embodiments of the concepts and technologies disclosed herein, the connection management service 110, the server computer 112, the resources 118, and/or the third party 136 can be implemented, at least in part, on the cloud computing platform 800. Those skilled in the art will appreciate that the illustrated cloud computing platform 800 is a simplification of but one possible implementation of an illustrative cloud computing environment, and as such, the cloud computing platform 800 should not be construed as limiting in any way.

The illustrated cloud computing platform 800 includes a hardware resource layer 802, a virtualization/control layer 804, and a virtual resource layer 806 that work together to perform operations as will be described in detail herein. While connections are shown between some of the components illustrated in FIG. 8, it should be understood that some, none, or all of the components illustrated in FIG. 8 can be configured to interact with one other to carry out various functions described herein. In some embodiments, the components are arranged so as to communicate via one or more networks (not shown). Thus, it should be understood that FIG. 8 and the following description are intended to provide a general understanding of a suitable environment in which various aspects of embodiments can be implemented, and should not be construed as being limiting in any way.

The hardware resource layer 802 provides hardware resources, which, in the illustrated embodiment, include one or more compute resources 808, one or more memory resources 810, and one or more other resources 812. The compute resource(s) 808 can include one or more hardware components that perform computations to process data, and/or to execute computer-executable instructions of one or more application programs, operating systems, and/or other software. The compute resources 808 can include one or more central processing units ("CPUs") configured with one or more processing cores. The compute resources 808 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 808 can include one or more discrete GPUs. In some other embodiments, the compute resources 808 can include CPU and GPU components that are configured in accordance with a co-processing CPU/GPU computing model, wherein the sequential part of an application executes on the CPU and the computationally-intensive part is accelerated by the GPU. The compute resources 808 can include one or more system-on-chip ("SoC") components along with one or more other components, including, for example, one or more of the memory resources 810, and/or one or more of the other resources 812.

In some embodiments, the compute resources 808 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 808 can be or can include one or more hardware components architected in accordance with an ARM architecture, available for license from ARM HOLDINGS of Cambridge, United Kingdom. Alternatively, the compute resources 808 can be or can include one or more hardware components architected in accordance with an x86 architecture, such an architecture available from INTEL CORPORATION of Mountain View, Calif., and others. Those skilled in the art will appreciate the implementation of the compute resources 808 can utilize various computation architectures, and as such, the compute resources 808 should not be construed as being limited to any particular computation architecture or combination of computation architectures, including those explicitly disclosed herein.

The memory resource(s) 810 can include one or more hardware components that perform storage operations, including temporary or permanent storage operations. In some embodiments, the memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 808.

The other resource(s) 812 can include any other hardware resources that can be utilized by the compute resources(s) 808 and/or the memory resource(s) 810 to perform operations described herein. The other resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 802 can be virtualized by one or more virtual machine monitors ("VMMs") 814A-814N (also known as "hypervisors;" hereinafter "VMMs 814") operating within the virtualization/control layer 804 to manage one or more virtual resources that reside in the virtual resource layer 806. The VMMs 814 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for a connection management service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
    a processor; and
    a memory that stores computer-executable instructions that, when executed by the processor, cause the processor to perform operations comprising
        detecting a request to create a connection between a first resource and a second resource, wherein the request is received from a computing device,
        obtaining, from the computing device, identification of the first resource,
        authenticating, based on obtaining the identification of the first resource, that the first resource is located in a proximity of the computing device, wherein the second resource is not located in the proximity of the computing device,
        obtaining connection information for the connection between the first resource and the second resource, and
        triggering creation of the connection using the connection information, wherein triggering the creation of the connection comprises negotiating a most secure connection available between the first resource and the second resource.

2. The system of claim 1, wherein the identification of the first resource is obtained from the computing device.

3. The system of claim 2, wherein the computing device obtains the identification of the first resource by scanning visual indicia located on the first resource using a camera of the computing device.

4. The system of claim 1, wherein the identification of the second resource comprises a globally unique identifier, and wherein the identification of the second resource is obtained from the computing device.

5. The system of claim 1, wherein a requestor associated with the request is authenticated based on identification information obtained from the computing device.

6. The system of claim 1, wherein the computer-executable instructions, when executed by the processor, cause the processor to perform operations further comprising:
    in response to detecting a failure in the creation of the connection, engaging a third party to complete the connection.

7. The system of claim 1, wherein the computer-executable instructions, when executed by the processor, cause the processor to perform operations further comprising:
    in response to detecting a failure in the creation of the connection, sending step-by-step instructions to the computing device to complete the connection.

8. The system of claim 1, wherein the connection information identifies operations to be performed to create the connection, and wherein the first resource and the second resource exchange data via the connection.

9. A method comprising:
- detecting, at a server computer comprising a processor, a request to create a connection between a first resource and a second resource, wherein the request is received from a computing device;
- obtaining, by the processor and from the computing device, identification of the first resource;
- authenticating, by the processor and based on obtaining the identification of the first resource, that the first resource is located in a proximity of the computing device, wherein the second resource is not located in the proximity of the computing device;
- obtaining, by the processor, connection information for the connection between the first resource and the second resource; and
- triggering, by the processor, creation of the connection using the connection information, wherein triggering the creation of the connection comprises negotiating a most secure connection available between the first resource and the second resource.

10. The method of claim 9, wherein the identification of the first resource is obtained from the computing device.

11. The method of claim 10, wherein the computing device obtains the identification of the first resource by scanning visual indicia located on the first resource using a camera of the computing device.

12. The method of claim 9, wherein the identification of the second resource comprises a globally unique identifier, and wherein the identification of the second resource is obtained from the computing device.

13. The method of claim 9, further comprising:
- in response to detecting a failure in the creation of the connection, engaging a third party to complete the connection.

14. The method of claim 9, further comprising:
- in response to detecting a failure in the creation of the connection, sending step-by-step instructions to the computing device to complete the connection.

15. A computer storage medium having stored thereon computer-executable instructions that, when executed by a processor, cause the processor to perform operations comprising:
- detecting a request to create a connection between a first resource and a second resource, wherein the request is received from a computing device;
- obtaining, from the computing device, identification of the first resource;
- authenticating, based on obtaining the identification of the first resource, that the first resource is located in a proximity of the computing device, wherein the second resource is not located in the proximity of the computing device;
- obtaining connection information for the connection between the first resource and the second resource; and
- triggering creation of the connection using the connection information, wherein triggering the creation of the connection comprises negotiating a most secure connection available between the first resource and the second resource.

16. The computer storage medium of claim 15, wherein the identification of the first resource is obtained from the computing device.

17. The computer storage medium of claim 16, wherein the computing device obtains the identification of the first resource by scanning visual indicia located on the first resource using a camera of the computing device.

18. The computer storage medium of claim 15, wherein the identification of the second resource comprises a globally unique identifier, and wherein the identification of the second resource is obtained from the computing device.

19. The computer storage medium of claim 15, wherein the computer-executable instructions, when executed by the processor, cause the processor to perform operations further comprising:
- in response to detecting a failure in the creation of the connection, engaging a third party to complete the connection.

20. The computer storage medium of claim 15, wherein the computer-executable instructions, when executed by the processor, cause the processor to perform operations further comprising:
- in response to detecting a failure in the creation of the connection, sending step-by-step instructions to the computing device to complete the connection.

* * * * *